United States Patent [19]

Murai et al.

[11] 4,353,299
[45] Oct. 12, 1982

[54] AUTOMATIC CONTROL SYSTEM FOR OFFSET PRINTING MACHINE

[75] Inventors: Kazuo Murai; Kenji Hashimoto; Kiyoshi Fukushima, all of Tokyo; Sumio Suzuki, Yamagata, all of Japan

[73] Assignee: Ricoh Co., Ltd., Japan

[21] Appl. No.: 225,606

[22] Filed: Jan. 16, 1981

Related U.S. Application Data

[63] Continuation-in-part of Ser. No. 952,536, Oct. 18, 1978, abandoned.

[30] Foreign Application Priority Data

Oct. 22, 1977 [JP] Japan .................................. 52-139559
Oct. 27, 1977 [JP] Japan .................................. 52-128137
Nov. 30, 1977 [JP] Japan .................................. 52-142585

[51] Int. Cl.$^3$ ............................ B41F 7/06; B41F 7/36; B41F 7/40; B41F 31/30
[52] U.S. Cl. .................................. 101/144; 101/148; 101/232; 101/352; 101/425
[58] Field of Search ..................... 101/132.5, 136, 137, 101/140, 141, 142–145, 148, 132, 350, 351, 352, 425, 232

[56] References Cited

U.S. PATENT DOCUMENTS

| | | | |
|---|---|---|---|
| 3,457,857 | 7/1969 | Burger | 101/144 |
| 3,603,253 | 9/1971 | Tonkin | 101/142 |
| 3,750,566 | 8/1973 | Ogawa | 101/144 |
| 3,771,446 | 11/1973 | Kaneko et al. | 101/144 |
| 3,804,005 | 4/1974 | Burger et al. | 101/132.5 X |
| 3,871,294 | 3/1975 | Kagari et al. | 101/132.5 |

*Primary Examiner*—J. Reed Fisher
*Attorney, Agent, or Firm*—McGlew and Tuttle

[57] ABSTRACT

An automatic control system for an offset printing machine includes a process execution instructions generating circuit having latched therein instructions for executing various operation processes and adapted to shift from one operation phase to another for successively generating process execution instructions, so that an ink forming and master plate feeding process, an inking process, a transfer-printing process, a printing process, and a master plate ejecting and cleaning process can be automatically executed in correct order. The number of times for executing each of the etching, inking, transfer-printing and cleaning processes can be adjusted in a process setting structure. When a master plate feeding error detecting signal is generated, the process execution instructions generating circuit is reset to an initial condition of stop instructions which prevailed prior to actuation of a start switch. When a master plate ejection error signal or other misoperation indicating signal is generated, the process execution instructions generating circuit remains latched to the current operation process, and a lamp is lighted to indicate the process in which misoperation has occurred. The period of time for moistening an etching roller can be determined depending on the number of copies to be produced. The control system allows the offset printing machine to manually execute any operation process or processes as desired.

13 Claims, 20 Drawing Figures

"1"

"2"

AUTOMATIC CONTROL SYSTEM FOR OFFSET PRINTING MACHINE

This is a continuation-in-part of U.S. patent application Ser. No. 952,536 filed on Oct. 18, 1978 and now abandoned.

BACKGROUND OF THE INVENTION

This invention relates to a control system for an offset printing machine.

As is well known, a number of process steps including ink kneading operation, a master plate feeding operation, an inking or ink forming operation, a transfer operation, a printing operation, and a master plate ejecting and cleaning operation must be executed for printing copies using a three-cylinder offset printing machine. A marker insertion operation may also be performed. When the printing machine is provided with an etching solution applicator, a master plate feeding and etching operation must be executed.

The aforementioned operational steps will be described in brief. A master plate, having an image formed thereon, is supplied by a plate feeding rubber roller and a plate feeding roller to a master cylinder in which the master plate is gripped at its leading end by the master cylinder and wound thereon. At the same time, an ink repellent etching solution is applied to the surface of the master plate, by an etching roller of an etching solution application, so that non-image regions of the plate will have affinity for water and image regions thereof will have affinity for oil (plate feeding and etching operation). At this time, inking rollers are moved away from the master cylinder, and an ink kneading step, in which ink is mixed with water and kneaded, is carried out by a set of ink forming rollers.

Following the etching operation, ink is applied to the surface of the plate by the inking roller (inking operation). An ink image formed on the plate in the inking operation is transferred onto a blanket cylinder (transfer operation). A sheet, on which the image is to be formed, is fed, by a sheet feeding roller and feeding roller, between the blanket cylinder and an impression cylinder, so that the image of the plate will be printed on the copy sheet (printing operation). When a predetermined number of copies of the plate image are produced, the master plate wound on the master cylinder is removed and ejected by means of plate ejecting rollers, and the surface of the blanket cylinder is cleaned to remove therefrom the ink image of the plate (plate ejecting and cleaning operation). One sheet only is then passed between the blanket cylinder and the impression cylinder so as to mark the different sets of copies (mark insertion operation).

Heretofore, a control shaft which can be stopped mechanically at a number of angular positions (control positions) for switching the operation of a offset printing machine between the various operations has been used to control the operation of the offset printing machine. The control shaft is operated by a click mechanism which moves the shaft stepwise to a desired control position, in order to thereby effect changeover of the operational processes. In this control method, the operator manually operates a lever so that the various printing operations will be executed in a predetermined order while the operator checks, for example, the number of revolutions of the master cylinder. Difficulties have hitherto been experienced in obtaining a full understanding by the operator of the complicated operations of an offset printing machine. Since the number of revolutions of the master cylinder is counted by the operator, there has been a variation from one operator to another in the period of time required for controlling the printing processes. Moreover, there have often been cases where it is difficult to determine the source of trouble when misoperation occurs during the printing processes.

Proposals have been made to use a sequence control system for controlling the printing processes of an offset printing machine. Such sequence control system uses relays, timers and other elements for sequentially programming the successive printing processes. This system has the disadvantages that it is difficult to switch the machine from automatic operation to manual operation, and that difficulties are encountered in putting back the machine to one of the operation processes which have already been executed, while the processes are being executed in chronological sequence. Additional disadvantages of this system are that the parts are large in number and the mechanism is complex. Therefore, it has been impossible to obtain a control system of high precision in performance, low cost and simple mechanism, when sequence control mechanism is incorporated in the control system.

SUMMARY OF THE INVENTION

An object of this invention is to provide an automatic control system for an offset printing machine which is capable of effecting operational control with a high degree of precision.

Another object is to provide an automatic control system for an offset printing machine which enables switching to manual operation of the printing machine to be effected with ease and permits the operations to be grasped by the operator without difficulty, and which includes circuits for facilitating the switching of the machine from automatic operation to manual operation and vice versa.

Another object is to provide a drive for a control shaft suitable for the automatic control system for the offset printing machine.

Another object is to provide a trouble reporting device for the control system for the offset printing machine which is capable of determining the source of trouble and providing a report on the trouble when misoperation occurs in some operation.

A further object is to provide a premoistening period selection circuit for the control system which is capable of determining the period of time for premoistening the etching roller, in accordance with the number of copies to be produced, in order to avoid the drying or excessive wetting of the etching roller of the ink repellent etching solution applicator.

Additional and other objects and characterizing features of the invention will become apparent from the description set forth hereinafter when considered in conjunction with the accompanying drawings.

DESCRIPTION OF THE PREFERRED EMBODIMENTS

Figure 1:
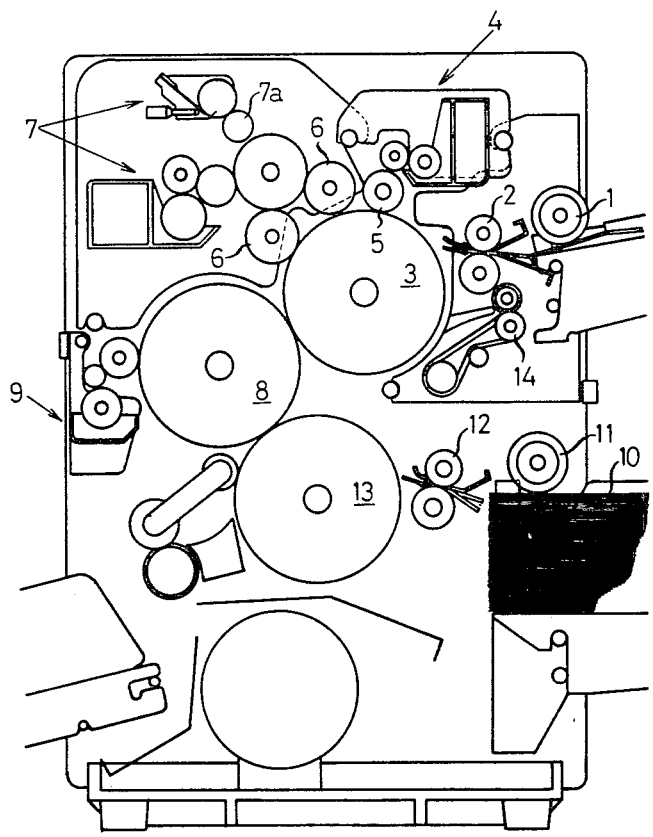
FIG. 1 is a schematic view of an offset printing machine in which the automatic control system according to this invention can be incorporated.

FIG. 1 shows a three-cylinder type offset printing machine having an etching solution applicator therein and adapted to execute a series of printing operations including ink kneading, master plate mounting and etching, inking, transfer printing, plate ejecting and cleaning, and marker insertion. As is known and described in the introduction, a master plate, on which an image is formed, is fed by a master plate feeder comprising a plate feeding rubber roller 1 and a plate feeding roller 2 to a master cylinder 3, the leading end of the plate is gripped by the master cylinder 3, and the plate is then wound on the outer periphery of the master cylinder 3. At the same time, an ink repellent etching solution is applied by an etching device 4 including an etching roller 5 to the surface of the master plate, so that non-image regions of the plate will have affinity for water and image regions of the plate will have affinity for oil. At this time, inking rollers 6 of an inking device are moved away from the master cylinder 3, and the ink kneading operation is executed by an ink kneading device 7 having a group of ink forming rollers.

Following the etching process, ink is supplied by the inking rollers 6 to the surface of the plate (inking operation). Then, an ink image, formed on the plate in the inking operation is transfer printed on a blanket cylinder 8 (transfer operation). A copy sheet 10 to be imprinted with the image fed by a sheet feeder having a sheet feed roller 11 and a feed roller 12, between the blanket cylinder 8 and an impression cylinder 13 to print the image of the master plate onto the copy sheet 10 (printing operation). When a predetermined number of copies have been produced from the plate, the plate wound on the master cylinder 3 is ejected by master plate ejections means including plate ejecting rollers 14, and at the same time the ink image on the outer periphery of the blanket cylinder 8 is removed, by a cleaning device 9, to clean the blanket cylinder 8 (plate ejecting and cleaning operation). Thereafter, a single sheet is passed between the blanket cylinder 8 and impression cylinder 13 to mark different sets of copies produced.

Figure 2:
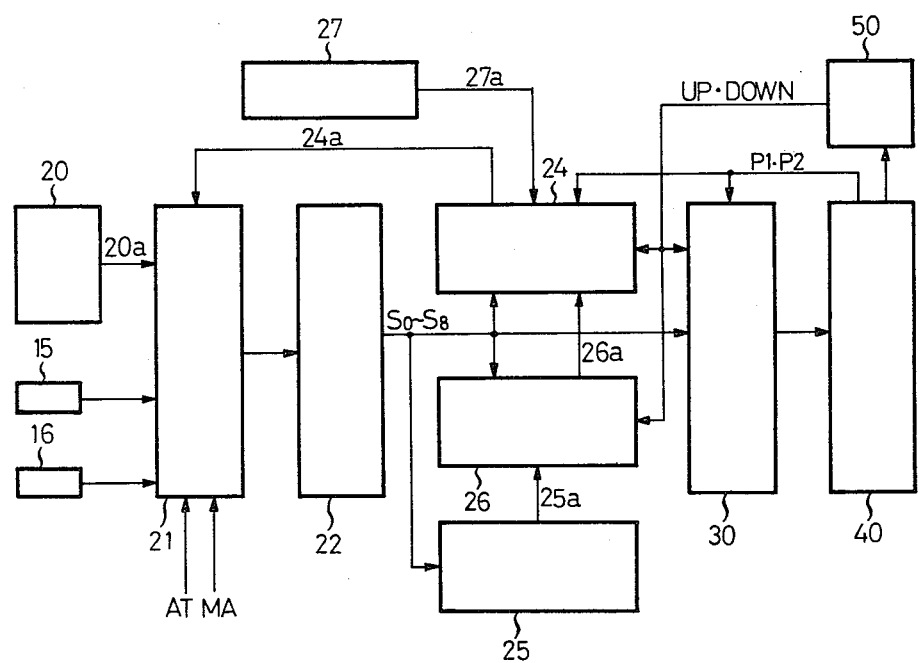
FIG. 2 is a block diagram showing the automatic control system comprising one embodiment of the invention.

FIG. 2 diagrammatically shows one embodiment of the control system of the offset printing machine which effects printing by following the aforesaid process steps. Block 20 is a manual input circuit, block 15 an automatic start switch, and block 16 an auto-manual switch for switching the printing machine between automatic operation and manual operation. Block 21 represents an input which permits the passage of a series of coded signals which represent manual operation instructions 20a from the manual input circuit 20, when the switch 16 is set for manual operation, and permits the passage of a series of coded signals which presents next operation process instructions 24a generated in next operation process judging means or subsequent state determining circuit 24 when the switch 16 is set for automatic operation.

These operation instructions 20a and 24a at this stage are binary coded signals (BCD) of four bits.

The block 22 shows a process execution instructions generating means or decoding section constituted by a 4-bit latch for holding a series of coded signals from the input selecting section 21 or latching the instructions therefrom and an instruction decode connected to the latch. The latch is a register including four D-flip flops and has four input terminals, and one clock input terminal. Each of the four D-flip flops will be set or reset depending on the presence or absence of signals at the respective input terminals by the leading edge, for example, of the clock applied to the clock input terminal. In short, it means that the coded signal representative of the instruction is latched in the register. The decoder is a circuit which reads out each combination of a group of input signals and then outputs an active signal to one of the "0"–"9" digit output terminals in response to the abovementioned reading. In practice, it is a BCD-To-Decimal Decoder and the digit output terminals corresponding to "2" and "9" are not used. The output terminals $S_0$, $S_1$, $S_3$, $S_4$, $S_5$, $S_6$, $S_7$ and $S_8$ corresponding to the decimals 0, 1, 3, 4, 5, 6, 7 and 8 are decode output terminals for the respective instructions such as stop, ink kneading, plate feeding and etching, inking, transfer, printing, plate ejecting and cleaning, and marker insertion, and the function signals generated therein will be utilized to control the corresponding functional groups of components in the printing machine. In other words, a complete operational cycle of the printing machine is divided into eight states or processes in dependence on the eight decoded instructions or function signals $S_0$–$S_8$ mentioned above. Table 1 shows the states thereof and the main operation therebetween.

TABLE 1

| State | Main Operation | Position of Control Shaft | Jump Condition | Next State |
|---|---|---|---|---|
| S0 | Stop | "1" | Start Switch | S1 |
| S1 | Ink Kneadint | "1" | S1, Control Shaft "1" | S3 |
| S3 | Plate Feeding and Etching | "1" | Misoperation in Plate Feeding | S0 |
|  |  |  | Agreement with Preset Etching Times | S4 |
| S4 | Inking | "2" | Agreement with Preset Inking Times | S5 |
| S5 | Transfer | "2" | Agreement with Present Transfer Times | S6 |
| S6 | Printing | "2" | Counter 0 | S7 |
| S7 | Plate Ejecting | "1" | Agreement with Preset Cleaning Times | S8 |
| S8 | Marker Insertion | "1" | In Repeat Mode | S3 |
|  |  |  | In Single Mode | S0 |

The process (state) execution instructions, i.e. the function signals S0–S8 generated by the process execution instructions generating means or decoding section 22 are selectively supplied, through an interface 30, to mechanical section 40 to energize the corresponding operation solenoids and actuate associated mechanisms, so that operations will be executed in accordance with the process execution instructions governing the function signals S0–S8. The main operations executed by the decoded instructions are as follows: stop (S0), ink kneading (S1), plate feeding and etching (S3), inking (s4), transfer (s5), printing (s6), plate ejecting and cleaning (S7), and marker insertion (S8). When these operations are manually executed, each operation is executed individually. However, in automatic operation, the processes execution instructions and thus the function signals S0–S8 are automatically provided successively because the next operation process judging means 24 generates next operation process instructions 24a, for each operation, based on each of the process execution instructions S1–S8 inputed thereto and the jump conditions stated in Table 1. In a single mode, the operational process returns from marker insertion S8 to Stop S0, while in a repeat mode, the operation process returns to plate feeding and etching S3 through the state of S1. Block 25 is operation process (duration) setting means for setting the number of times each of plate feeding and etching, inking, transfer, printing and plate etching and cleaning operations is executed. Block 26 is a section adapted to compare the actual number of times each operation is actually executed with the set number of times of operation set for each state by the operation process setting means 25, and upon detecting coincidence between the actual number and the set number feeds a coincidence signal to the successive state determining circuit 24 so that a next following operation instruction is given by the operation process judging means 24 in place of the present instruction. Block 27 is a presetable copy number counter in which the number of copies to be produced is set. Each time a copy is produced, one is deducted from the number set in the counter 27 and the counter 27 produces an output signal 27a when the number set therein becomes zero. Block 50 is a synchronizing unit for producing a synchronizing pulse responsive to one complete revolution in synchronism with one of the cylinders.

Figure 3:
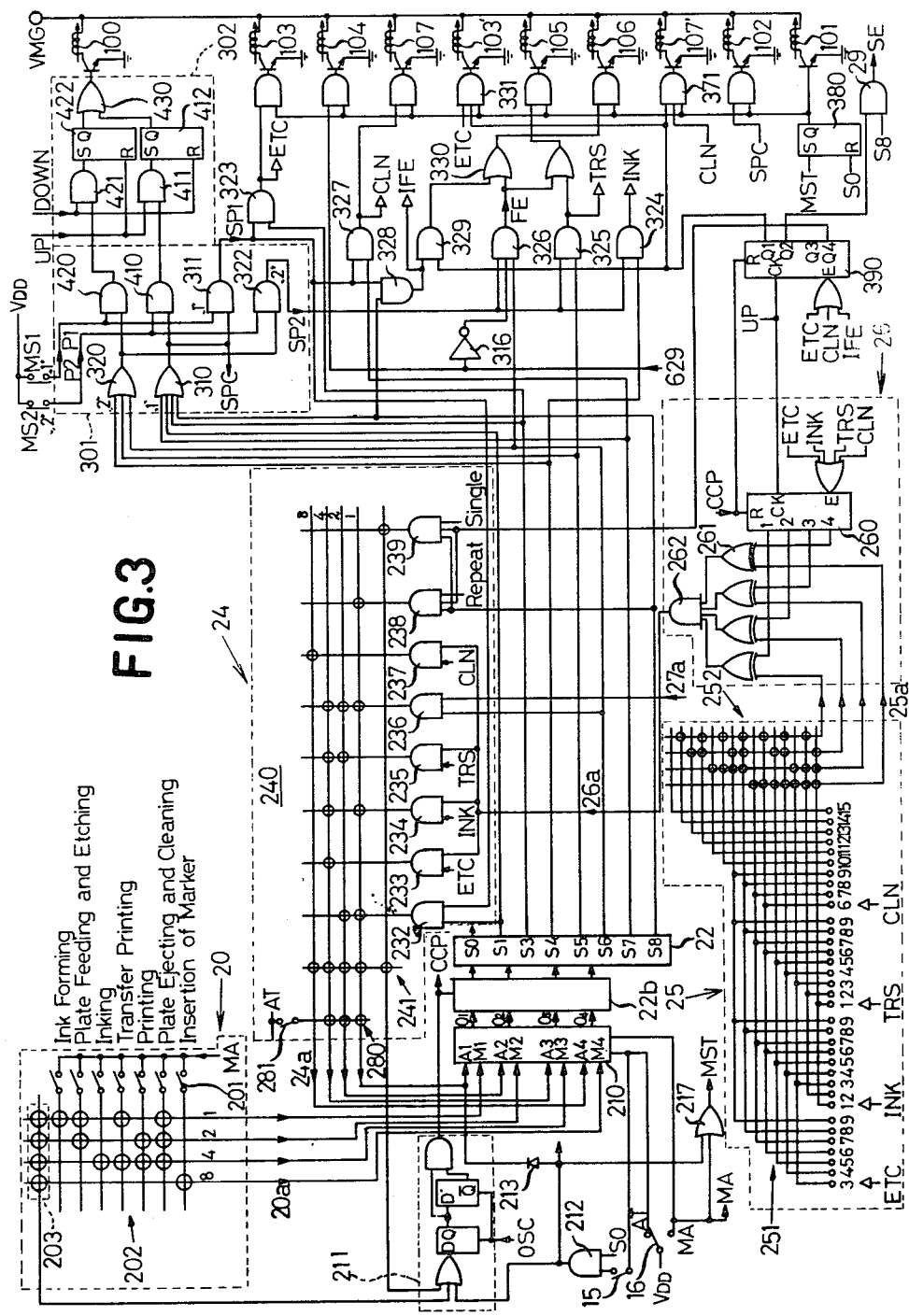
FIG. 3 is a circuit diagram of the automatic control system shown in FIG. 2.

Referring to FIG. 3, the manual input circuit 20 includes manual input operation switches 201 for the ink kneading, plate feeding and etching, inking, transfer, printing, plate ejecting and cleaning, and marker insertion operations, and a coder 202 which is arranged in the form of a diode matrix for decimal to BCD conversion and include, in the matrix, a manual operation process detector 203 adapted to produce an output when any one of the switches 201 is selected. The matrix 202 or the decimal to BCD conversion circuit of consists of a plurality of input conductors or digit "1", "3", "4", "5", "6", "7" and "8" lines of decimal number connected to the manual operation switches, a set of four output conductors or 1st, 2nd, 4th and 8th weight lines, and a plurality of diodes for connecting each input conductor to a selected one or selected one of the output conductors so that the decimal number selected by said manual operation switch is converted to the corresponding BCD code. That is, the matrix 202 produces predetermined operation process data 20a of four bits when the associated operation switch 201 is actuated.

The input judging means 21 includes an input selecting gate 210 and a single pulse generator 211. The input selecting gate 210 has input terminals which are switched between a set of four automatic input terminals A1–A4 and a set of four manual input terminals M1–M4 by the auto-manual switch 16. The input selecting gate 210 has a set of four output terminals (01–04) at which the input side of the latch in the process execution instructions generating means 22. The automatic input terminals A1–A4 are connected to the output terminals of a signal conversion means in the circuit 24, described hereafter, and the manual input terminals M1–M4 are connected to the output terminals of the manual input circuit 20. The single pulse generator 211 has input terminals connected to the manual operation process detector 203, an automatic operation process detector 241 (subsequently to be described) of the successive state determining circuit 24, and an AND gate 212 which is one of components constituting a start gate means. Thus, the single pulse generator 211 generates a clocked clock pulse (CCP) synchronized with the pulses from an oscillator OSC each time one of the manual operation process switches 201 is actuated in manual operation, and each time the start switch 15 is actuated or the next operation process data signal 24a is generated by the next operation process judging means 24 in automatic operation. The AND gate 212 produces an output if the start switch 15 is actuated when the process execution instructions generating means 22 is in a state of stop S0, and supplies a BCD code "0001" as an ink kneading instruction (S1) to the input selecting gate 210, that is the input A1 of the gate 210 becomes "H" level through a diode 213.

The content of the latch in the circuit 22 is replaced with the inputed instruction in response to the pulse CCP generated by the single pulse generator 211.

The mechanical section 40 includes an etching solenoid 103 for rotating the etching roller 5, a plate feeding solenoid 103' for rotating the plate feeding rubber roller 1, an ink supply cut-off solenoid 104 for stopping the rotation of an ink transfer roller 7a of the ink kneading device 7, a transfer solenoid 105, a sheet feeding solenoid 106 for rotating the sheet feeding roller 11, a cleaning solenoid 107 for actuating the cleaning device 9 and a plate ejecting solenoid 107' for actuating the plate ejector roller 14. A relay 101 is provided for a drive motor which is energized and actuates the drive motor when a flip-flop 380 is set by a motor start signal MST from an OR gate 217 which is one of components constituting the start gate means. The OR gate 217 has two input terminals, one input terminal being connected to a manual side MA of the change-over switch 16 and the other input terminal being connected to an output terminal of the AND gate 212 whose two inputs consists of a signal from the start switch 15 and the process execution instruction S0 from the circuit 22. Thus, the motor start signal MST is generated both in automatic operation and in manual operation.

Figure 4:
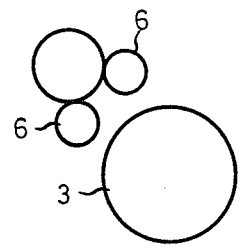
FIGS. 4 and 5 are schematic views showing the relative positions of the inking rollers and the master cylinder which vary depending on the position of the control shaft.
Figure 5:
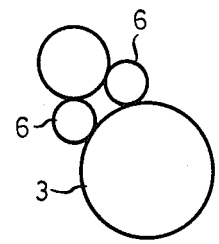

When the etching process, plate ejecting and cleaning process and marker insertion operations are executed, it is necessary that the inking rollers 6 be moved away from the master cylinder 3 as shown in FIG. 4. Conversely, when the inking process, transfer process and printing operations are executed, the inking rollers 6 should be in contact with the master cylinder 3 as shown in FIG. 5. The condition shown in FIG. 4 can be mechanically created when a control shaft 41 (see FIG. 6) of the printing machine is in a first position "1", and the condition shown in FIG. 5 can be mechanically created when the control shaft 41 is in a second position "2". The position "1" and "2" shown in the third column from the left of Table 1 Process Execution Instructions represents the positions in which the control shaft 41 is to be located when the process execution instructions S0–S8 are carried out. The mechanical section 40 include a control shaft mechanism 401 shown in FIG. 6, in order that the processes will be executed only when such relations are established. The mechanism 401 includes a cam and linkage means 42–52 for moving the control shaft 41 between the first and second positions, and a control solenoid 100 as a drive means for actuating the cam linkage for switching the control shaft between the both positions.

The interface 30 includes a control shaft position judging circuit 301 for judging whether the position of the control shaft 41 is in or out of agreement with the various process execution instructions S0 to S8, AND gates 323 to 328 for delivering the function signals to the solenoid in the mechanical section 40 after ascertaining that the control shaft 41 is located in a proper position, and a change-over control circuit 302 for energizing the control solenoid 100 to switch the control shaft 41 to a correct position when the shaft 41 is not located in the correct position.

The control shaft position judging circuit 301 includes an OR gate 310 for taking out the process execution instructions S1, S3, S7 and S8, and an OR gate 320 for taking out the process execution instructions S4, S5 and S6. The both gates 310 and 320 are used to designate a correct position to be taken by the control shaft respectively. The OR gate give a first position setting signal to move the control shaft 41 to position "1" while the OR gate 320 gives a second position setting signal to move the control shaft 41 to position "1", while the OR gate 320 gives a second position setting signal to move the control shaft 41 to position "2". The first position setting signal "1" given by the OR gate 310 is taken out as a speed control signal SPC for energizing a motor speed changing solenoid 102 for reducing the speed of rotation of the cylinders.

Figure 6:
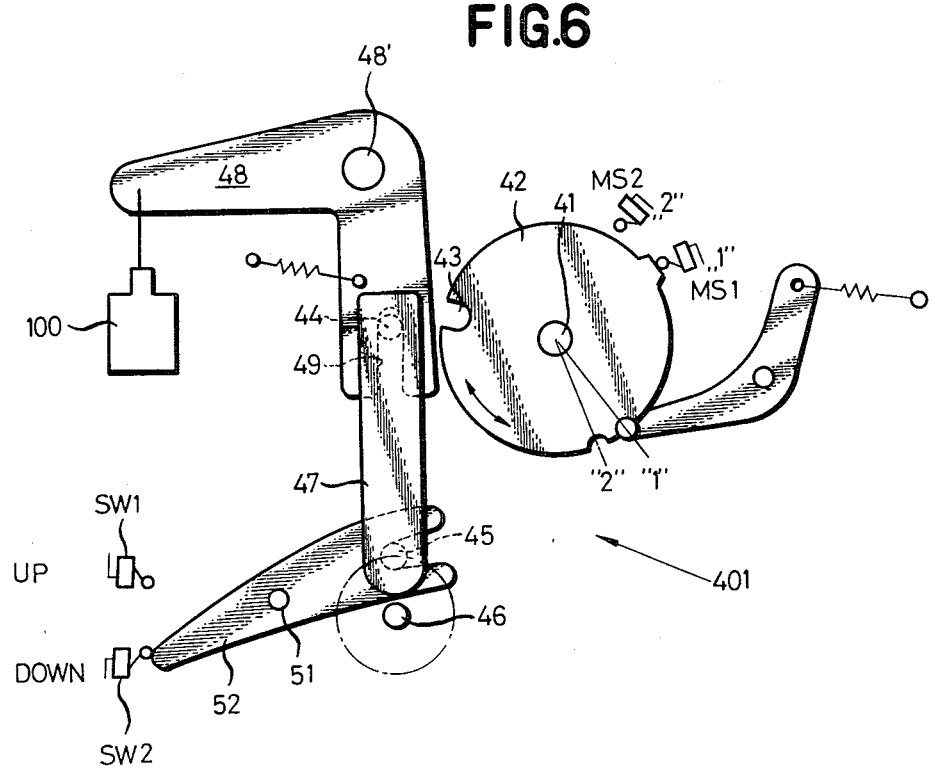
FIG. 6 is a schematic view of the control shaft mechanism for effecting change-over of the positions of the control shaft.

MS1 and MS2, which are control shaft position detecting switches mounted around the control shaft 41 as shown in FIG. 6 for detecting the actual position of the control shaft 41, produce a control shaft position signal P1 when the control shaft 41 is in position "1" and a control shaft position signal P2 when the shaft 41 is in position "2" respectively. An AND gate 410 (see FIG. 3) produces an output to rotate the control shaft 41 clockwise in FIG. 6 when the actual control shaft position is "2" or the control shaft position signal P2 is produced while the OR gate 310 designates the first position setting signal "1". An AND gate 420 produces an output to rotate the control shaft 41 conouterclockwise in FIG. 6 when the actual control shaft position is "1" or the control shaft position signal P1 is produced while the OR gate 320 designates the second position setting signal "2∞". An AND gate 311 (see FIG. 3) is supplied, as its two inputs, with signals from the OR gate 310 and the switch MS 1 and produces a first position agreement signal SP1 when the position of the control shaft 41 is "1" as indicated by the first position setting signal. Likewise, an AND gate 322 is supplied, as its two inputs, with signals from the OR gate 320 and the switch MS2 and produces a second position agreement signal SP2 when the position of the control shaft 41 is "2" as indicated by the second position setting signal.

In the cam and linkage means of the control shaft mechanism shown in FIG. 6, change-over of the control shaft 41 between positions "1" and "2" is effected by bringing a control pin 44 into engagement in a click recess 43 formed in a control disk (cam) 42 to rotate the control shaft 41 in a predetermined direction.

A pin 45 revolves around a shaft 46 in synchronism with the cylinders for moving a connecting rod 47 up and down. As a result, the control pin 44 secured to the connecting rod 47 also moves up and down in a slit 49 formed in an L-shaped control lever 48. A pivotal lever 52, which is pivotally connected to a shaft 51, is in engagement at its rear end with the pin 45, so that a forward end of the lever 52 actuates the switches SW1 and SW2 when the forward end is positioned in its upper limit position and in its lower limit position respectively. The pivotal lever 52 and switches SW1 and SW2 function as a synchronizing unit 50 shown in FIG. 2. Synchronizing signals produced by the synchronizing unit 50 include an "UP" synchronizing signal produced by the upper switch SW1 and a "DOWN" synchronizing signal produced by the lower switch SW2.

When the control shaft 41 is to be moved from position "1" to position "2" in FIG. 2, the control solenoid 100 is energized as the control pin 44 moves to an upper position. More specifically, when the AND gate 420 of the control shaft position judging circuit 301 gives a counterclockwise rotation signal "2", the AND gate 421 of the change-over control circuit 302 produces an output, only when a "DOWN" synchronizing signal is produced, to set a flip-flop 422. When the flip-flop 422 is set, it produces an output which energizes the control solenoid 100 through an OR gate 430. This causes a control lever 48 to move in pivotal motion about a shaft 48', with a result that the control pin 44 is brought into engagement in the click recess 43. Thus, the control disk 42 begins to rotate counterclockwise as the pin 45 revolves, to thereby move the connecting rod 47 downwardly. When the control disk 42 reaches position "2" or when an "UP" synchronizing signal is produced, the flip-flop is reset, thereby de-energizing the control solenoid 100. On the other hand, when the control shaft 41 is to be moved from position "2" to position "1", the control solenoid 100 is energized as the control pin 44 moves to its lower position and de-energized as the control pin 44 moves to its upper position.

More specifically, when the AND gate 410 of the position judging circuit 301 gives a clockwise rotation instruction "1", an AND gate 411 of the change-over control circuit 302 produces an output only when an "UP" synchronizing signal is produced, so as to set a flip-flop 412. When the flip-flop 412 is set, it produces an output to energize the control solenoid 100 through the OR gate 430. In this way, the control disk 42 is moved clockwise or from position "2" to position "1" by the revolving force of the pin 45 in the same manner as described with reference to the movement of the control shaft 41 from position "1" to position "2". The flip-flop 412 is reset by a "DOWN" synchronizing signal.

The first position agreement signal SP 1 produced by the AND gate 311 of the position judging circuit 301 is supplied to a first input terminal of each of the AND gates 323, 327 and 328 for ascertaining whether or not the position is correct, and the second position agreement signal SP2 produced by AND gate 322 is supplied to a first input terminal of each of the AND gates 324, 325 and 326. The process execution instructions or the function signals S3, S4, S5, S6, S7 and S8 are given to a second input terminal of the AND gates 323, 324, 325, 326, 327 and 328 respectively. Thus, AND gate 323 lets go the signal S3 as an etching signal ETC, AND gate 324 lets go the signal S4 as an inking signal INK, AND gate 325 lets go the signal S5 as a transfer-printing signal TRS, AND gate 326 lets go the signal S6 as a sheet feeding signal FE, AND gate 327 lets go the signal S7 as a cleaning signal CLN and AND gate 328 lets go the signal S8 as a last signal, i.e., a marker insertion signal IFE. Signal ETC energizes the etching solenoid 103 and associated mechanisms and is also inputed to an AND gate 331 to energize the plate feeding solenoid 103' therethrough. Transfer signal TRS energizes the transfer solenoid 105, and sheet feeding signal FE energizes the sheet feeding solenoid 106 through an OR gate 330. Cleaning signal CLN energizes the cleaning solenoid 107 and at the same time energizes the plate ejecting solenoids 107' through an AND gate 371. Marker insertion signal IFE energizes the sheet feeding solenoid 106 through the AND gate 328 and an OR gate 329.

The next operation process judging means 24 includes AND gates 232 to 239 as jump gate means and a signal conversion means 240 which is arranged in the form of a matrix of diodes and include in the matrix, a process change-over detector 241 which produces an output when any one of the AND gates 232 to 239 produces a signal. The first AND gate 232 lets the ink kneading instruction or the signal S1 pass therethrough when a position agreement SP1 is produced. One input terminal of the AND gates 233 to 235 and 237 is connected to an output terminal of an AND gate 262, which is one of components constituting a coincidence circuit, of the counted number agreement judging means 26 and opened by an output of the gate 262. The second AND gate 233 lets the etching signal ETC pass therethrough, the third AND gate 234 lets the inking signal INK pass therethrough, the fourth AND gate 235 lets the transfer signal TRS pass therethrough, and the sixth AND gate 327 lets the cleaning signal CLN pass therethrough.

The fifth AND gate 236 of the next operation process judging means 24 lets the printing step instruction or the signal S6 pass therethrough, when the copy number counter 27 produces the output signal 27a indicating that the number of sheets is zero. The diode matrix 240 has a plurality of input conductors each connected to a respective one of the AND gates 232–239 in the jump gate means, a set of four output conductors or 1st, 2nd, 4th and 8th weight lines and plurality of diodes as interconnecting means to connect one of all the input conductors excluding the input conductor coupled to the seventh AND gate 239 to a selected one or selected ones of the output conductors in accordance with the Decimal to BCD conversion. The instruction 24a of a four-bit BCD code representative of a function signal corresponding to any one of etching (S3), Inking (S4), transfer (S5), printing (S6), cleaning (S7), marker insertion (S8) and termination (S0) functions is produced on the output conductors by means of said first, second, third, fourth, fifth, sixth, and seventh AND gates 232–239. The AND gates 238 and 239 have the function of judging whether the printing cycle is a single mode or a repeat mode, and the marker insertion instruction or the signal S8 is inputed to a first terminal of each of these two AND gates 238 and 239 and an output Q4 of a binary counter 390, subsequently to be described, is inputed to a second input terminal thereof. A repeat mode signal is inputed to a third input terminal of the eight AND gate 238, while a single mode signal is inputed to a third input terminal of the seventh AND gate 239.

The operation process setting means 25 includes four independent rotary switches 251, and a coder comprising code generators 252 arranged in the form of a matrix of diodes. A common contact of each of the rotary switches 251 is connected to a line of one the etching signal ETC, inking signal INK, transfer signal TRS and cleaning signal CLN, so that the rotary switches are effected selectively by these signals to produce process setting data 25a consisting of four bits from the associated code generator 252. More specifically, the present values representative of the desired number of times for etching, inking, transferring and cleaning functions becomes effective selectively in response to receipt of one of the function signals ETC, INK, TRS and CLN corresponding to the above four functions, and the coder coupled to the output sides of the four rotary switches convert the present value from the selected rotary switch into a corresponding binary signal. The counted number agreement judging means 26 includes a counter, such as a binary counter 260 and the coincidence circuit which has four exclusive OR gates 261 receiving as two inputs a digit of one digit position of the counter 260 and one of the four bits produced by the code generators 252, and the AND gate 262 receiving, as four inputs, outputs of these OR gates 261. The counter 260 begins to count the "UP" synchronizing signals from the time any one of the etching ETC, Transfer TRS and cleaning CLN signals is produced, and reset by the pulse CCP of the single pulse generator 211 each time one process execution instruction is replaced by another process execution instruction.

The interface 30 has mounted therein a sequence counter 390 for providing a required time for effecting plate feeding, plate ejection and marker insertion at the beginning of the etching, cleaning, and marker insertion operations. Like the counter 260 of the counted number agreement judging means 26, the counter 390 counts the "UP" synchronizing signals each time any one of the etching, cleaning and marker insertion signals is produced. A decoded output Q1 of the counter is supplied to one input terminal of the AND gate 329 which has another input terminal connected to the AND gate 328.

The decoded output Q1 of the counter 390 is also supplied to a first input terminal of the AND gate 331 for plate feeding, and to a first input terminal of the AND gate 371 for plate ejection. A decoded output Q2 of the counter 390 is supplied to an AND gate 29 which produces one pulse when the decoded output shifts from Q1 to Q2 while the process execution instruction S8 is being given, so that the pulse produced will be utilized as a data enter signal SE for resetting the contents of the copy number counter 27 to its initial value, for example.

The automatic operation of the machine as performed in a single mode will now be described by referring to the time chart shown in FIG. 7 and the flow chart shown in FIG. 8.

The automatic/manual operation change-over switch 16 is set to automatic operation, and the electronic counter 27 of the ten-key input system is set at the number of copies to be produced before the start switch 15 is pressed. It is to be understood that the number of times for execution of the operations set at the process setting means 25 is such that etching, inking and transfer operations are each executed three times and the cleaning operation is executed five times. The decoded output of the process execution instructions generating section 22 is usually in the stop S0 state, that is, the AND gate 212 is opened by the signal S0. Therefore, upon the start switch 15 being pressed, the AND gate 212 produces an automatic start signal (point A in FIG. 7). This start signal is applied to the input terminal A1 of the input selecting gate 210 through diode 213, so that the BCD code "0001" is inputed to the set of four input terminal A1–A4 and at the same time inputed to the single pulse generator 211 to cause the generator 211 to generate a pulse CCP which is fed to the clock input terminal of the latch in the circuit 22. This instantaneously switches the process execution instructions generating means 22 from the state of S0 to a state of ink forming instruction execution S1 (step 1 in FIG. 8) since the BCD code "0001" is set into the latch of the circuit 22 by the pulse CCP. Actuation of the start switch 15 generates a motor start signal MST through OR gate 21 which is one of components constituting the start gate means, and sets the flip-flop 380 (see FIG. 3) to actuate a drive motor. As a result, ink kneading commences and the cylinders begin to rotate. As the cylinders rotate, the synchronizing unit 50 generates the "UP" and "DOWN" synchronizing signals each time the cylinders make one complete revolution. When the instructions S1, S3, S7 and S8 are given, the velocity of rotation of the cylinders is reduced because the speed control signal SPC generated by OR gate 310 actuates a speed changing solenoid 102; when instructions S4, S5 and S6 are given, the cylinders rotate at high speed. However, in FIG. 7 the synchronizing signals are shown to occur at regular intervals for the sake of convenience. The "UP" and "DOWN" synchronizing signals are 180° out of phase with each other. Thus, one of the two signals or "UP" signal, is generated first. At this time, the inking rollers 6 are disposed as shown in FIG. 5, so that if a clockwise rotation signal "1" is produced in the AND gate 410 of the control shaft position judging circuit 301, then the control solenoid 100 is energized by the change-over control circuit 302 between the productions of "UP" and "DOWN" synchronizing signals to thereby move the control shaft 41 to position "1" (point B in FIG. 7).

If the control shaft 41 moves to position "1", then the position agreement signal SP1 is produced by the position judging circuit 311 and opens the AND gate 232 of the next operation process judging means 24 which produces an output. Thus, the code generator 240 belonging to this gate produces a BCD code "0011" for plate feeding and etching instructions S3 which is supplied to input terminals A1 to A4 of the input selecting gate 210. At this time, the automatic process detector 241 produces an output pulse which is inputed to the single pulse generator 211, to cause the generator 211 to generate a pulse CCP, by which the BCD code "0011" is set into the latch of the circuit 22 and the operation process execution instructions generating means 22 jumps to a state of S3.

Thus, a plate feeding and etching instruction or function signal S3 is produced at the process execution instructions generating means 22, and sent as an etching signal ETC through the AND gate 323 to the etching solenoid 103, so that the etching roller 5 begins to rotate. Meanwhile the etching signal ETC is supplied to the AND gate 331 for the plate feeding solenoid 103' and the AND gate 233 of the next operation process judging means 24 to open these two gates. At the same time, the etching signal ETC, is supplied to the counter 260 of the counted number agreement judging means 26 and to the counter 390, to render the two counters operative to count the numbers. The etching signal ETC is also supplied to the rotary switch 251 of the process setting means 25 for setting the number of times of operation of the etching operation, so that an etching process setting code which represents the set number is generated by the code generator 252 belonging to the rotary switch 251.

Figure 7:
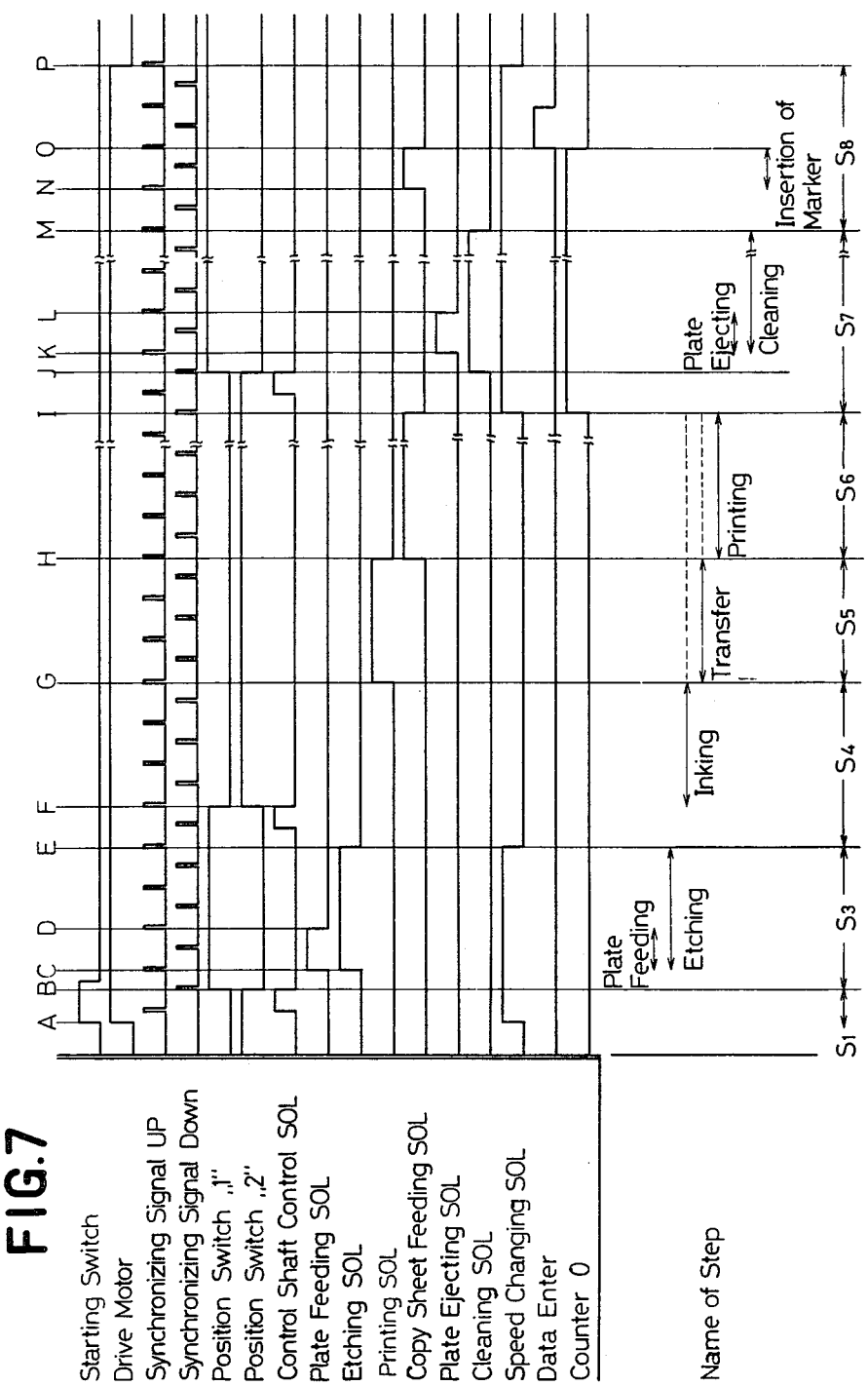
FIG. 7 is a timing chart showing the timing of operations performed by the principal elements shown in FIG. 3 in a single mode.

When the synchronizing unit 50 produces a first "UP" synchronizing signal as the cylinders rotate, an output is produced in the terminal Q1 of the counter 390 (point C in FIG. 7). Therefore, the AND gate 331 produces an output to energize the plate feeding solenoid 103' to thereby feed a plate which is clamped to the master cylinder 3 (step 2 in FIG. 8). Thereafter, the master cylinder makes one complete revolution while having an etching solution applied thereto. If a second "UP" synchronizing signal is produced, the output in the terminal Q1 of the counter 390 disappears, so that the plate feeding solenoid 103' is de-energized (point D in FIG. 7). When etching is performed a predetermined number of times of during three complete revolutions of the master cylinder 3 and the counter 260 of the counted number agreement judging means 26 counts the fourth "UP" synchronizing signals produced after the generation of the etching signal ETC, the coded output of the counter 260 agrees with the code set at the process setting means 25 (step 3 in FIG. 8). This gives rise to an agreement signal 26a in the AND gate 262 of the counted number agreement judging means 26 which signal opens the AND gate 233 of the next operation process judging means 24. This causes the code generator 240 belonging to the AND gate 233 to produce an inking process instruction S4 of the BCD code "0100" which is inputted to the input judging means 21, and at the same time the process changeover detector 241 produces a signal which causes the single pulse generator 211 to produce a pulse CCP by which the BCD code "0100" is set into the latch of the circuit 22. Thus, the process execution instructions generating means 22 jumps to a state of inking instruction execution S4 (step 4 in FIG. 8). This results in the disappearance of the etching signal ETC, and the etching solenoid 103 is de-energized, so that the etching roller 5 stops rotating.

Also, the speed control signal SPC from the OR gate 310 of the control shaft position judging circuit 301 disappears, and the speed changing solenoid 102 is de-energized. As a result, the operation of the machine is switched to high speed operation (point E in FIG. 7). The counters 260 and 390 are reset by the pulse CCP.

Upon an inking instruction or inking signal S4 being produced by the process execution instructions generating means 22, a control shaft position instruction "2" is given by the control shaft position judging circuit 301 to OR gate 320. AND gate 420 produces as its output a counterclockwise rotation signal. Thus, the change-over control circuit 302 is rendered operative to cause the control solenoid 100 to be energized by a "DOWN" synchronizing signal and de-energized by an "UP" synchronizing signal, so as to move the control shaft 41 from position "1" to position "2" (point F in FIG. 7). A position agreement signal SP2 is produced in the AND gate 322 of the control shaft position judging circuit 301, and an inking signal INK is obtained in the AND gate 324 and supplied to the third AND gate 234 of the next operation process judging means 24. At the same time, the inking signal INK is supplied to the rotary switch 251 for etching of the process setting means 25 to cause an inking code which represents the set number, to be produced by the code generator 252 belonging to the inking rotary switch 251. The inking signal INK is supplied to the counter 260 of the counted number agreement judging means 26 to render the counter 260 operative to count the number. Inking is performed under these conditions (step 4 in FIG. 8).

If the inking operation is executed the number of times set at the process setting means 25 or during the time in which the cylinders each make three complete revolutions, then the contents or counted value of the counter 260 counting the "UP" synchronizing signals coincides with the set data on the inking process which is the output of the coder in the process setting means 25, so that an agreement signal or coincidence signal 26a will be produced in the AND gate 262 of the counted number agreement judging means 26 (step 5 in FIG. 8), The signal 26a opens the third AND gate 234 of the next operating process judging means 24 to pass the inking signal INK or S4, so that a transfer operation instruction of the BCD code "0101" is produced by the code generator 240 belonging to the third AND gate 234 and fed to the input judging means 21. The process change-over detector 241 of the next operation process judging means 24 produces an output which is fed to the clock input terminal of the latch in the circuit 22 so that the operation process execution instructions generating means 22 jumps to a state of transfer instruction S5 upon receipt of a pulse CCP from the single pulse generator 221 (step 6 in FIG. 8). The counter 260 is reset by the pulse CCP.

If a transfer instruction S5 is decoded, then a transfer signal TRS is produced through the AND gate 325 to energize the transfer solenoid 105 (at point G in FIG. 7). Thus, a transfer process is executed. The transfer signal TRS is supplied to the fourth AND gate 235 of the next process judging means 24. At the same time, the signal TRS is supplied to the counter 260 of the counted number agreement judging means 26 to render the counter operative to count the number. Upon the transfer operation being executed the predetermined number of times or during the time in which the cylinders each make three complete revolutions, the contents of the counter 260 coincides with the transfer operation data set at the operation process setting means 25, and an agreement signal or coincidence signal 26a is produced by the counted number agreement judging means 26 (step 7 in FIG. 8). This signal is inputed to the fourth AND gate 235 of the next operation process judging means 24 to open the AND gate 235 so that the transfer signal TRS reaches to the diode matrix 240 of the signal conversion means. The code generator 240 belonging to the AND gate 235 produces a printing operation instruction of the BCD code "0110" which is inputed to the input judging means 21. The process change-over detector 241 produces an output to cause the single pulse generator 211 to produce a pulse CCP by which the BCD code "0110" is latched in the circuit 22. Therefore, the counter 260 is reset and the process execution instructions generating means 22 jumps to a state of printing instructions S6 (step 8 in FIG. 8). If a printing instruction S6 is decoded, then a sheet feeding signal FE is produced through the AND gate 326 and fed to the sheet feeding solenoid through OR gate 330 (point H in FIG. 7). The sheet feeding roller 11 rotates to feed copy sheets 10, so as to carry out printing. Each time one copy is produced, the number set in the copy number counter 27 is reduced by one (step 9 in FIG. 8).

If the contents of counter 27 become zero, then a zero signal 27a is produced to open the fifth AND gate 236 of the next operation process judging means 24, and the code generator 240 belonging to the AND gate 236 produces, at its output, plate ejecting and cleaning operation instruction of the BCD Code "0111" which is inputted to the input judging means 21. The process change-over detector 241 produces a signal which causes the single pulse generator 211 to produce a pulse CCP, so that the process execution instructions generating means 22 jumps to a state of plate ejecting and cleaning instruction S7 (point I in FIG. 7).

If a plate ejecting and cleaning instruction S7 is decoded, the OR gate 310 of the control shaft position judging circuit 301 produces an output which energizes the speed changing solenoid 102, with the result the speed of operation of the machine is reduced again. A position setting signal "1" is produced in the AND gate 410, and the control solenoid 100 is energized between the productions of "UP" and "DOWN" synchronizing signals by the action of the AND gate 411 of the change-over control circuit 302. Thus, the control shaft 41 returns to position "1" (point J in FIG. 7). The AND gate 311 of the position judging circuit 301 produces a position agreement signal SP1 which is fed to AND gate 327 so that the instruction S7 reaches as a cleaning signal CLN to the cleaning solenoid 107 through the AND gate 307. This causes a cleaning process to be executed. The clean signal CLN is fed to the AND gate 371 of the plate ejecting solenoid 107′ and the sixth AND gate 237 of the next operation process judging means 24, and renders the counters 260 and 390 operative to count the numbers. Upon the master cylinder rotating to produce an "UP" synchronizing signal, an output is produced at the Q1 of the counter 390 to energize the plate ejecting solenoid 107′ (point K in FIG. 7), so that a plate ejecting operation is executed (step 10 in FIG. 8). The plate ejecting solenoid 107′ is de-energized when the counter 390 counts a second "UP" synchronizing signal (point L in FIG. 7). Meanwhile cleaning is performed the predetermined number of times. When five "UP" synchronizing signals are counted by the counter 260 of the counted number agreement judging means 26 following the production of the cleaning signal CLN, the contents of the counter 260 coincides with the data set at the operation process setting means 25 (step 11 in FIG. 8). A coincidence signal 26a is inputed to the sixth AND gate 237 of the next operation process judging means 24 to open the gate 237 so that the cleaning signal CLN reaches to the diode matrix 240. Thus, the code generator 240 belonging to the AND gate 237 produces marker insertion instruction of the BCD code "1000" which is supplied to the input judging means 21. At the same time, the automatic process detector 241 produces a signal, and the single pulse generator 211 produces a pulse CCP which sets the process execution instructions generating means 22 to a state of marker insertion process instruction S8 (point M in FIG. 7). The pulse CCP resets the counters 260 and 390. The instructions S7 disappears and the cleaning solenoid 107 is de-energized.

If a marker insertion instruction S8 is decoded, the instruction is given to the AND gates 238 and 239 of the next operation process judging means 24 to open the seventh AND gate 239 for single mode operation which has been selected. At the same time, the instruction is given to the AND gate 328, so that a marker insertion signal IFE will be produced. The production of the signal IFE renders the counter 390 operative to count the number. Thereafter, if the counter 390 counts a first "UP" synchronizing signal and produces an output at Q1, then the Q1 output opens the AND gate 329 and the marker insertion signal IFE is passed through an OR gate 330 to energize the sheet feeding solenoid 106 (point N in FIG. 7). If the counter 390 counts a second "UP" synchronizing signal following one complete revolution of each cylinder, then the Q1 output disappears and the sheet feeding solenoid 106 is de-energized (point 0 in FIG. 7). Thus, only one sheet 10 is fed (step 12 in FIG. 8). The Q2 output of the counter 390 causes the AND gate 29 to produce a data enter signal which sets the copy number counter 27 at an initial value.

Figure 8:
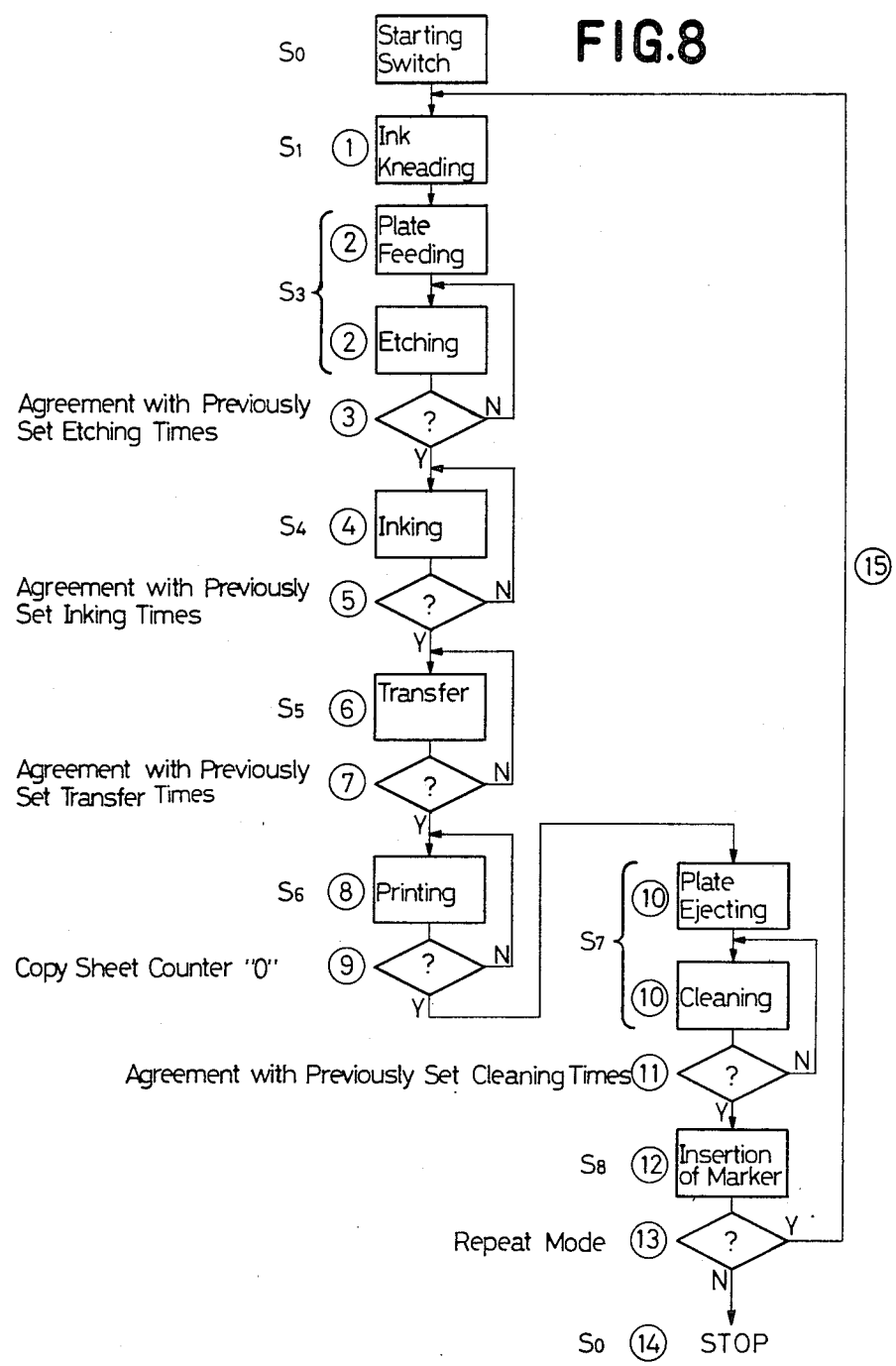
FIG. 8 is a flow chart showing the operations of the principal elements shown in FIG. 7.

If the cylinders rotate and the counter 390 counts a fourth "UP" synchronizing signal following the production of the marker insertion signal IFE, then the counter 390 produces a Q4 output which is supplied to the AND gate 238 and 239 to judge whether the operation is single mode or repeat mode (step 13 in FIG. 8). In the example now being described, single mode has been selected. Therefore, the seventh AND gate 239 produces an output, and the code generator 240 belonging to the AND gate 239 supplies a stop instruction of the BCD code "0000" to the input judging means 21. In actual practice, it is advantageous to eliminate the code generator by using the code "0000" as the code for the stop process data as shown in FIG. 3. Simultaneously as the seventh AND gate 239 produces an output, the process changeover detector 241 produces a signal, and the operation process instructions generating means 22 is caused to jump to a state of stop instructions S0 by the ratching of the BCD code "0000" upon a pulse CCP from the single pulse generator 211.

The production of the stop instruction S0 resets the flip-flop 380 of the drive motor relay 101, thereby stopping the motor (point P in FIG. 7). The speed control signal SPC produced by the OR gate 310 disappears, thereby de-energizing the speed changing solenoid 102.

Thus, a series of operation processes have been executed and the printing machine becomes inoperative (step 14 in FIG. 8).

In repeat mode, the eighth AND gate 238 of the next operation process judging means 24 is effected by the marker insertion instruction S8 or last signal. When a fourth "UP" synchronizing signal is counted after the marker insertion instruction S8 has been given, the counter 390 produces a Q4 output which is inputed to the eight AND gate 238, and the code generator 240 belonging to the AND gate 238 supplies an ink kneading instruction of the BCD code "0001" to the input judging means 21. A signal from the process changeover detector 241 causes the single pulse generator 211 to produce a pulse CCP which resets the counter 390 and causes the process execution instructions generating means 22 to set to a state of ink kneading instruction S1 (step 15 in FIG. 8). Thereafter, the operation steps described above are repeated.

The automatic control system described hereinabove includes the process execution instructions generating means 22 for producing the process execution instructions generating means 22 produce any one of the process execution instructions S0 to S8 as desired with ease.

Other advantages offered by the invention are that, as presently to be discussed, it is possible to use the process execution instructions S0 to S8 for various purposes to increase the precision and reliability with which the printing machine can perform its operations readily and with little expense. For example, the AND gate 326 for governing the print signal FE could be changed into a three-input AND gate, and an output terminal of an inverter 316 connected to a sheet jam detector, not shown, could be connected to a third input terminal of the AND gate 326. In this arrangement, if a sheet jam signal 629 is produced, the AND gate 326 would be rendered inoperative. Therefore, sheet feeding solenoid 106 would not be energized, thereby preventing jamming of the next following sheet. In FIG. 3 the ink cut-off solenoid 104 is energized by the sheet jam signal, and the solenoid 104 stops the rotation of the ink transfer roller 7a of the ink form rollers 7.

Another advantage offered by the invention is that a code generator could be mounted separately midway in the four-bit output bus of diode matrix 240 of the next process judging means 24, to thereby change the process to be executed following the process now being executed. For example, as shown in FIG. 3, a code generator 280 similar to the code generator belonging to the AND gate 236 may be provided and a cycle termination switch 281 may be provided to cause the machine to jump into a state of plate ejecting and cleaning instructions S7 which is given at the termination of the cycle of processes, regardless of which operation is being executed.

Figure 9:
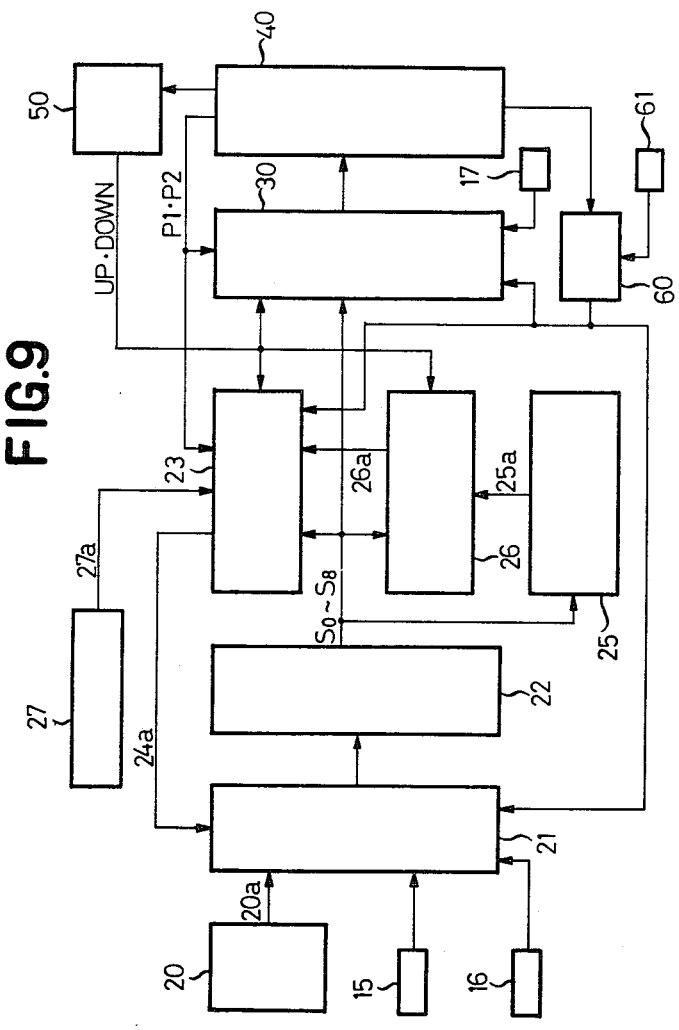
FIG. 9 is a block diagram showing the automatic control system comprising another embodiment of the invention.

FIG. 9 shows a second embodiment of the automatic control system for a three-cylinder type offset printing machine in conformity with the invention. The system shown in FIG. 9 differs from the system shown in FIG. 2 in that a stop switch 17, an error detecting unit 60 and a reset switch 61 for the unit 60 are additionally mounted in the former. The error detecting unit 60 produces an error signal when misoperation occurs in feeding a plate, ejecting a plate, feeding a sheet or when the cover is open. In case an error signal is produced, the input judging means 21 is rendered inoperative.

Figure 10:
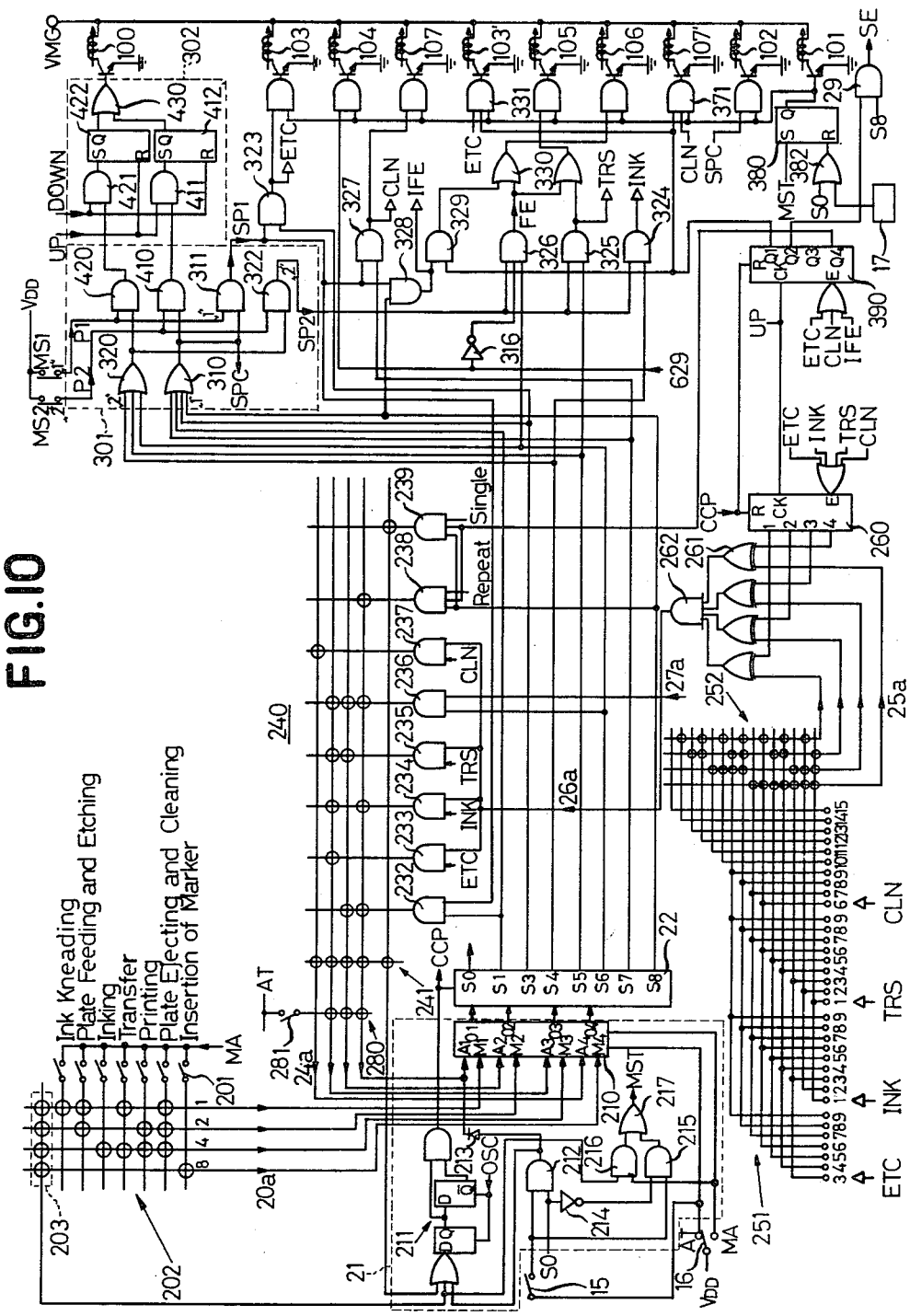
FIG. 10 is a circuit diagram of the automatic control system shown in FIG. 9.

FIG. 10 is a circuit diagram showing a concrete example of circuits of the system shown in FIG. 9. Unlike the start gate means shown in FIG. 3, a start gate means shown in FIG. 10 has AND gates 215 and 216 connected to one input terminal of an OR gate 217 and the other input terminal thereof respectively. The AND gate is supplied, as two inputs, with a signal from the manual process detector 203 and a signal from a manual side MA of the change-over switch 16. Therefore, the AND gate 216 produces an output when the machine is switched to manual operation and when one of the manual process switches 201 is pressed. The AND gate 215 is inputed with a signal from the start switch 15 and an S0 signal inverted by an inverter 214. Therefore, the AND gate 215 produces an output when the start switch 15 is pressed to change a process execution instruction given by the process execution instructions generating means 22 from S0 to S1, and when the start signal 15 is depressed while other process instruction than the stop instruction S0 is being given. Therefore, a motor start signal MST is produced both in manual operation and automatic operation. The flip-flop 380 of the drive motor relay 101 is reset when a stop instruction S0 or a signal from the stop switch 17 is inputed to an OR gate 382 connected to a reset input terminal of the flip-flop 380.

Figure 11:
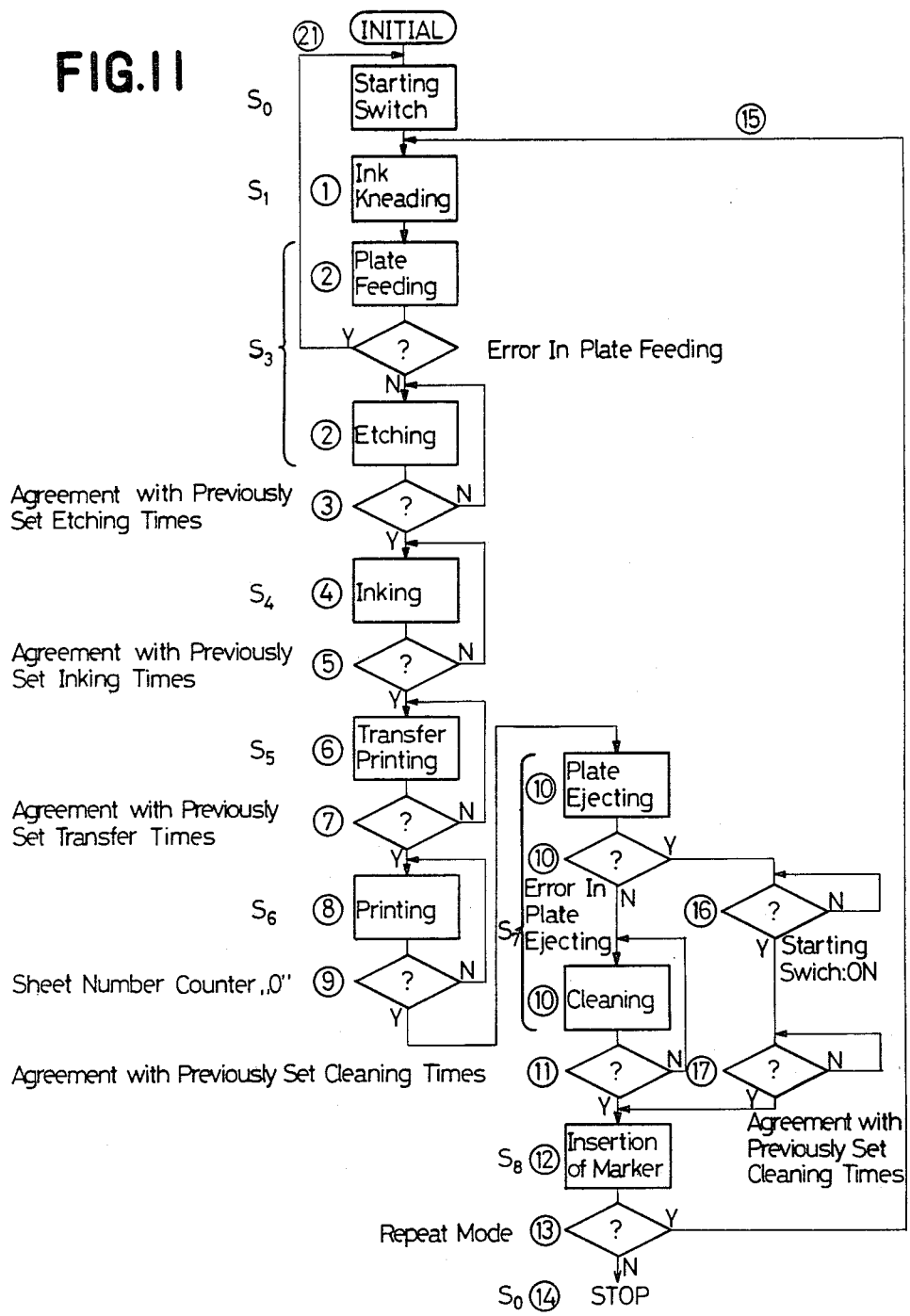
FIG. 11 is a flow chart showing the operations performed by the principal elements of FIG. 10 in a single mode.

What is particularly noteworthy is that, when trouble of some sort occurs and the machine is shut down by actuating the stop switch 17 while a series of operation processes are successively executed, the resetting of the operation processes can be executed by starting at the interrupted operation process, if the start switch 15 is pressed again after the cause of trouble is removed. For example, assume that misoperation occurs in ejecting a plate in the plate ejecting and cleaning process. When this is the case, the machine jumps from step 10 to step 16 in FIG. 11 and the machine is shut down. If the master is taken out and the start switch is pressed again, the AND gate 215 produces an output which causes the OR gate 217 to produce a motor start signal MST, thereby actuating the motor again. Thus, the printing machine jumps to a stage following the stage in which misoperation in plate ejection has occurred or to the execution of the remainder of the cleaning process (step 17 in FIG. 11). Thus, the machine jumps to the marker insertion process after cleaning is effected the predetermined number of times.

It will be apparent that the aforesaid automatic control system can have application in printing machines which have no etching means and printing machines which lack a marker insertion process.

In printing machines having etching means, it is necessary to repeat a plate feeding and etching process, in case misoperation has occurred in feeding a plate. More specifically, it is necessary to reset the plate and then to restore the operation process instructions generating means 22 to a state prior to actuation of the start switch or to a state of stop instruction S0. To this end, as shown in FIG. 12, an AND gate 231 supplied, as its two inputs, with a plate feeding error signal 616 and the plate feeding and etching instruction S3, and a code generator belonging to the AND gate 231.

Figure 12:
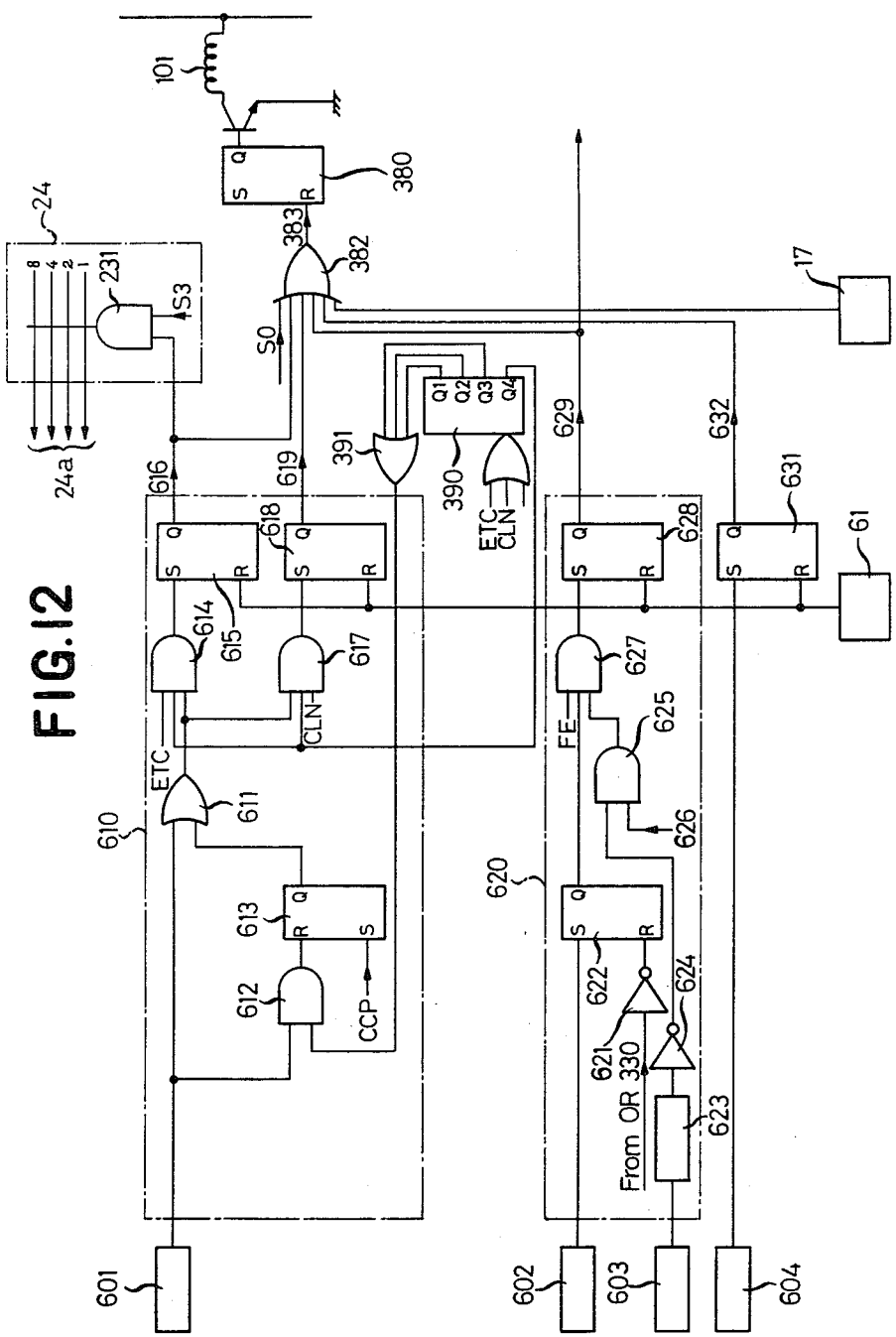
FIG. 12 is a circuit diagram of the error detection device shown in FIG. 9.

In FIG. 12, 610 designates a plate feeding and ejecting error detecting circuit, and 620 designates a sheet feeding error detecting circuit. 601 is a plate passage detecting switch, 602 is a sheet feeding commencement detecting switch, 603 is a sheet detecting switch and 604 is a cover switch.

Detection of a plate feeding error is carried out as follows. When one process execution instruction jumps to another process execution instruction, a pulse CCP sets a flip-flop 613 shown in FIG. 12. At etching signal ETC is supplied to an AND gate 614 and the counter 390 in accordance with the process instruction S3. The counter 390 produces a Q1 output to energize the plate feeding solenoid 103. If plate feeding is carried out and detected by the detecting switch 601, a detection signal is supplied through an OR gate 611 to the second input terminal of the AND gate 614 and an AND gate 612. Thus, the AND gate 612 produces an output which resets flip-flop 613. If plate feeding is carried out without any error, the detection signal disappears, so that the AND gate 614 produces no output even when the counter 390 produces a Q4 output. However, the detection signal does not disappear and remains when there is an error in feeding a plate. When this is the case, the three inputs are applied to the AND gate 613 upon the counter 390 producing a Q4 output, so that the AND gate 614 produces an output which sets flip-flop 615 to cause the latter to produce a plate feeding error signal 616. When no detection signal is produced, the flip-flop 613 remains in a set state, so that a plate feeding error signal is produced by a Q4 output of the counter 390. The detecting switch 601 is also capable of detecting the ejection of a plate by means of two-arm lever which is pivotally movable. An AND gate 617 and a flip-flop 618 are provided for detecting a plate ejection error, and the flip-flop 618 produces a plate ejection error signal 619 in the same manner as a plate feeding error occurs.

Detection of a sheet feeding error is carried out as follows: Simultaneously as the OR gate 330 produces an output to energize the sheet feeding solenoid 106, an output of an inverter 621 disappears. If the sheet feeding roller 11 rotates and the detecting switch 602 (see FIG. 12) detects the rotation of the roller 11, the switch 602 produces a signal which sets a flip-flop 622. If a sheet is actually fed and the detecting switch 603 detects the sheet, the switch 603 produces a signal which passes through a delay circuit 623 and the inverter 624 to render an AND gate 625 inoperative. The delay circuit 623 provides time for the sheet to be clamped by gripping claws of the impression cylinder. If no sheet is fed or if a sheet feeding error occurs, then the AND gate 625 produces an output when a sheet feed timing signal 626 is produced while an output of the inverter 624 is being given. An AND gate 629 produces an output when an output of the AND gate 625 is supplied thereto together with a signal from the flip-flop 622 while the sheet feeding signal FE is being given. That is, the AND gate 627 produces an output, when no sheet is fed, to set a flip-flop 628 to cause the latter to produce a sheet feeding error signal 629 which is inputed to the inverter 316 shown in FIG. 10. The inverter 316 produces an output at L-level to render the AND gate 326 inoperative. Therefore, the sheet feeding solenoid 106 is not energized even if a printing process instruction S6 is produced, thereby preventing jamming of sheets. In FIG. 10, the ink cut-off solenoid 104 is energized by the sheet jam signal or sheet-feeding-error signal 629 to thereby stop the rotation of the ink transfer roller 7a of the ink kneading device 7.

When the cover is open, a flip-flop 631 is set by the detecting switch 604 to produce a cover error signal 632.

These error signals 616, 619, and 632 are inputed to an OR gate 382 (see FIGS. 10 and 12) together with a stop instruction S0 and a signal from the stop switch 17. An error signal 383 from the OR gate 382 resets the flip-flop 380 for the drive motor relay 101, thereby stopping the rotation of the motor.

The flip-flops 615, 618, 238 and 631 of the error detecting unit 60 are reset by a reset switch 61.

If the plate feeding error signal 616 is produced while the plate feeding and cleaning process execution instruction S3 is being given (step 21 in FIG. 11), the ninth AND gate 231 of the next process judging means 24 and the code generator 240 belonging to the AND gate 231 produces a stop instruction S0 of the BCD code "0000". This restores the printing machine to its initial state and the machine is shut down. Thus, it is possible to restart the machine by resetting the plate and pressing the reset switch 61. When the error signal 383 is produced by other trouble or when the machine is shut down by actuating the stop switch 17, it is possible to let the machine continue its operation by resuming the process which has been interrupted, by pressing the start switch 15.

When any one of the aforementioned error signals is produced while a series of processes are successively executed, it is difficult for the operator who stays outside the machine to determine in what process the trouble has occurred. According to the invention, it is possible to readily indicate the process in which trouble has occurred by utilizing the fact that no two process execution instructions are given for one period of time.

Figure 13:
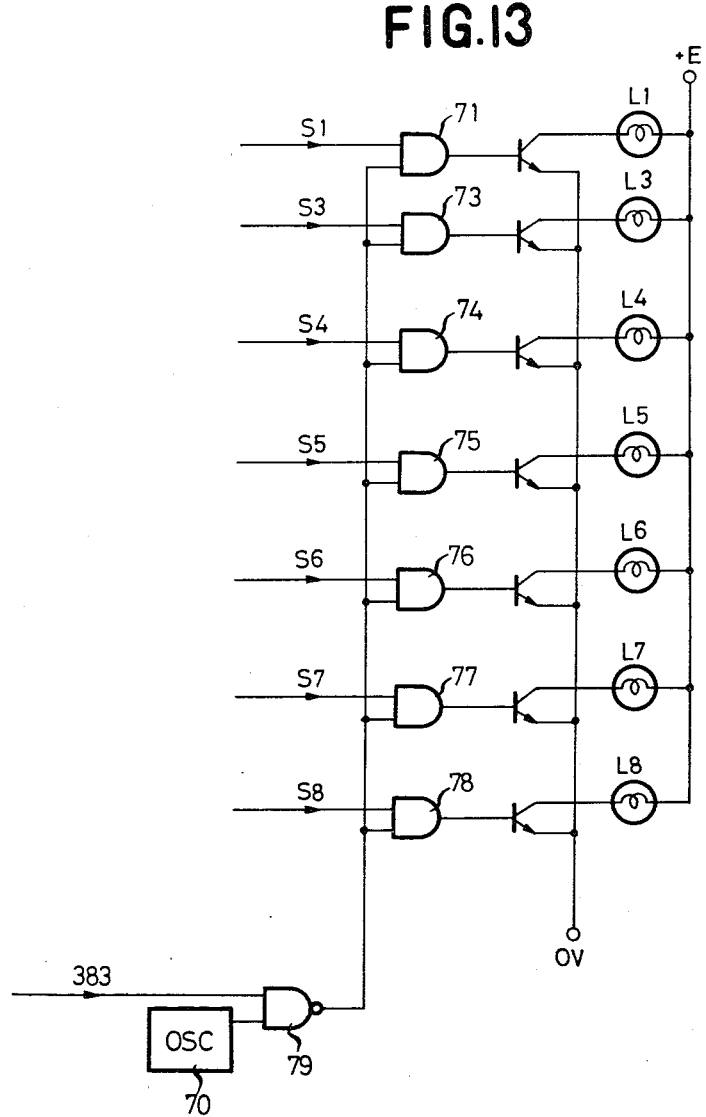
FIG. 13 is a circuit diagram of the trouble indication device.

FIG. 13 shows a trouble reporting device in which L1, L3, L4 L5, L6, L7 and L8 designate lamps for ink kneading, plate feeding and etching, inking, transfer printing, plate ejecting and cleaning and marker processes respectively. These lamps are turned on through transistors by the process execution instructions S1, S3, S4, S5, S6, S7 and S8. AND gates 71, 73 to 78 are each mounted anterior to one of the transistors and inhibited when an output of a NAND gate 79 is at L-level. One input terminal of the NAND gate 79 is connected to a low frequency generator 70 and the other input thereof is connected to receive the error signal 383. Thus, when trouble occurs, a low frequency from the generator 70 causes the NAND gate 79 to intermittently produce an L-level output. The process execution instructions S0 to S8 are successively given, so that if trouble occurs while any one of the processes is being executed, the lamp of the process being executed is turned on and off. For example, if the printing process lamp L6 is turned on, a sheet feeding error is indicated. The trouble reporting device shown by way of example indicates trouble as well as the process being executed, thereby enabling production cost of an indication device to be reduced. It is to be understood that the lamps L1 to L8 can be used exclusively for indicating errors. In this case, the lamps are turned on only when an error signal is produced.

In the embodiments shown in FIGS. 3 and 10, the etching solenoid 103 is energized only during the time an etching signal ETC is produced. Therefore, the etching roller 5 is moistened only during the time an etching process execution instruction S3 is given. However, when the number of copies produced is large, the etching roller would be dried and would not be able to perform etching satisfactorily for the next master plate because the printing process for the plate now on the master cylinder takes a long time to execute. To eliminate this disadvantage, it is advantageous either to increase the time for executing the etching process or to perform premoistening of the etching roller while other operation processes than the etching process are being executed and while the control shaft is in position "1". Thus premoistening of the etching roller 5 can be effected while the cleaning process is being executed. However, if the time for executing the etching process is increased, the overall time required for executing a series of operation processes of a printing machine would be increased. If premoistening of the etching roller 5 is effected while some other process is being executed, the etching solution absorbed by the etching roller would be excessive for producing a small number of copies which takes a short period of time for executing a printing process, with a result that the plate would show a phenomenon of excess etching.

Figure 14:
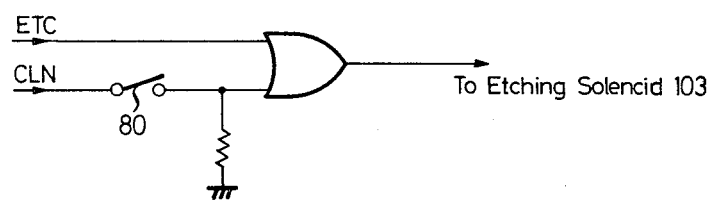
FIGS. 14 and 15 show examples of the premoistening period selection circuit.
Figure 15:
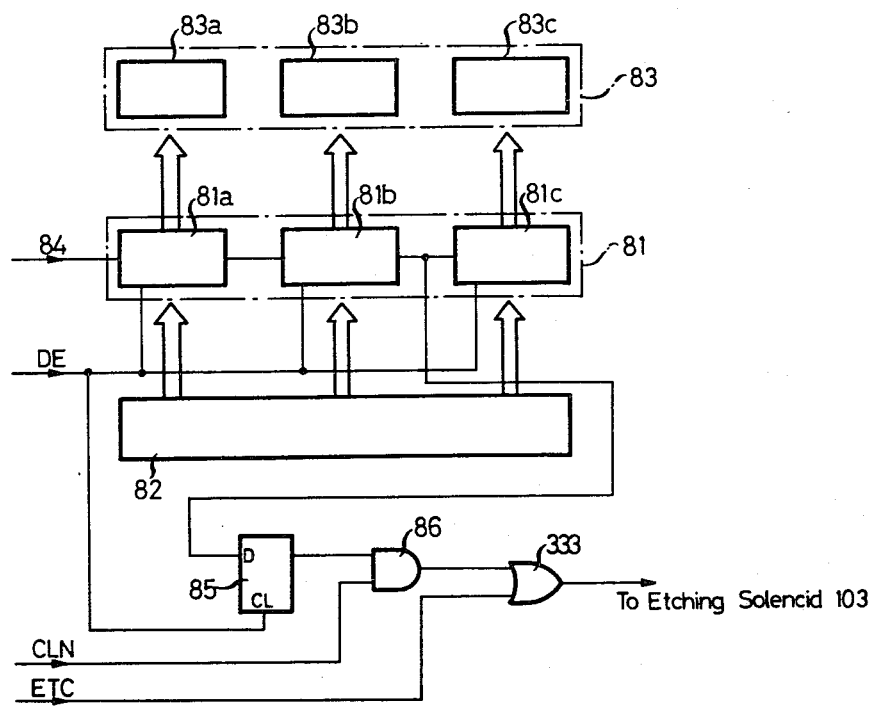

To prevent this disadvantage, it is advantageous to provide a premoistening selection circuit, shown in FIG. 14 or 15, which is mounted anterior to the drive circuit for the etching solenoid 103. The premoistening selection circuit includes a premoistening selection switch 80 which passes the cleaning signal CLN when the copies produced are large in number, and an OR gate 333 which is supplied, as two inputs, with the cleaning signal CLN passed by the switch 80 and the etching signal ETC. FIG. 14 shows the premoistening selection switch 80 as a switch which is selectively operated manually by the operator, and the switch 80 shown in FIG. 15 is in the form of an electronic switch which is automatically actuated when the number of copies to be produced exceeds a predetermined level.

In the circuit shown in FIG. 15, 81 designates a presettable counter copy number counter 27 for counting produced copy indicating pulses 84 which are produced each time a copy is produced. The counter 81 is reset by an input register 82 of the ten key system, and includes counters 81a, 81b, and 81c which count the numbers in the digit positions of ones, tens and hundred respectively. The contents of the counters 81a, 81b, and 81c are indicated by indicating portions 83a, 83b and 83c, respectively, of an indicator 83. 85 designates a latching circuit which performs latching by utilizing an output indicating agreement in number of the counter 81b and which produces an output for opening an AND gate 86 mounted in the cleaning signal bus of OR gate 333. The counter 81 counts down the produced copy indicating pulses 84. When the copies produced are lower than a level set by the register 82, no output indicating agreement in number is produced by the counter 81b and no output is produced by the latching circuit 85. As a result the AND gate 86 is effective to prevent premoistening of the etching roller 5 while the cleaning process is being executed. However, when the copies produced are higher than the level set by the register 82, the counter 81b produces an agreement output and an output is produced by the latching circuit 85, so that AND gate 86 is opened by the output of the latching circuit 85. Thus, the etching solenoid 103 is energized when the cleaning signal CLN is produced for executing a cleaning process, to carry out premoistening of the etching roller 5. The counter 81 and latching circuit 85 are cleared by the data enter signal DE.

It will be appreciated that if the level of the produced copies is automatically judged and premoistening of the etching roller is effected while a cleaning process is being executed only when the copies produced are large in number, it is possible to supply an etching solution to the etching roller in optimum amount. In FIG. 15, the counter 81b produces an output indicating agreement in number, because the judgement of whether a printing process produces a larger number of copies or a small number of copies is based on a number 100. It is to be understood, however, that the basis on which large copy number printing can be distinguished from small copy number printing may be a number 1000, in which case the counter 81c produces an output indicating agreement in number for rendering the latching circuit operative.

Figure 16:
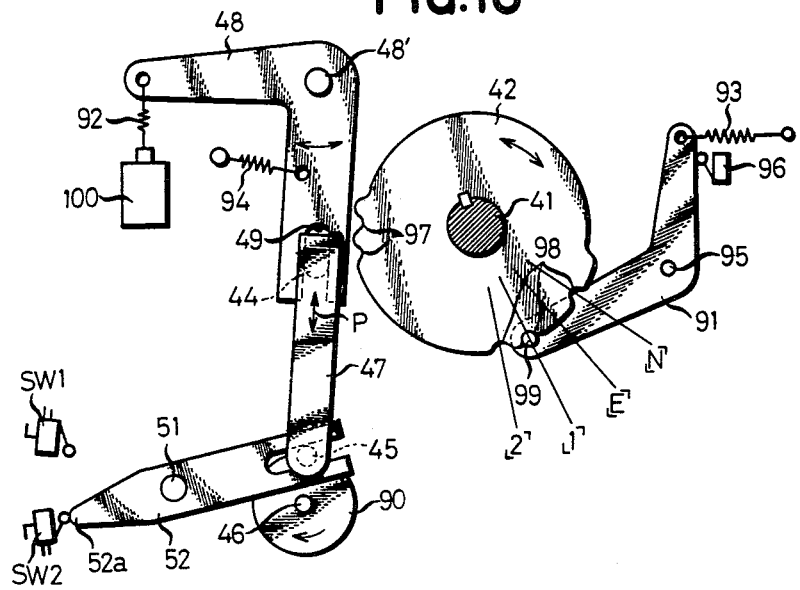
FIG. 16 is a schematic view of a modification of the control shaft mechanism.
Figure 17:
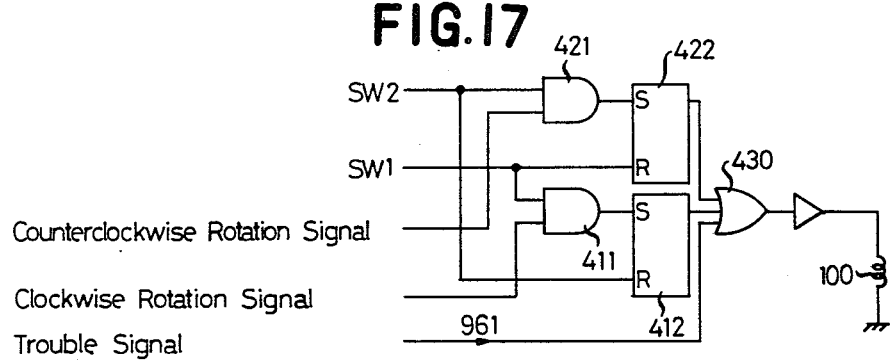
FIG. 17 shows a circuit for effecting control of the changeover of the positions of the control shaft mechanism shown in FIG. 16.
Figure 18:
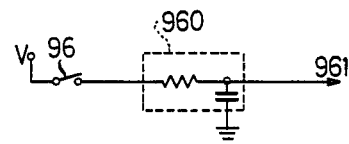
FIG. 18 shows a circuit for detecting misoperation of the control shaft mechanism shown in FIG. 16.

FIGS. 16 to 18 show a modification of the drive for a rotatable control shaft which has a plurality of control positions. In the control shaft mechanism shown and described hereinabove, a click mechanism is used for positively stopping the control shaft in control positions. A click mechanism consists in the engagement of a click pin in a click recess. This mechanism may not function satisfactorily when the force of a spring is low. That is, the click pin may stop in a crest between two recesses and may not be brought into engagement in a desired recess if the force of the spring is low. The embodiment shown in FIGS. 16 to 18 is provided with means for automatically actuating a control unit to move the control shaft to a normal position when the control shaft does not reach a normal control position after lapse of a predetermined period of time.

In FIG. 16, the drive shaft 46 normally rotates during the operation of the machine. Rotation of the drive shaft 46 causes lever 52 to normally move in pivotal motion about shaft 51, through pin 45 secured to drive disk 90. The lever 52 actuates, at its forward end 52a, the upper switch SW1 when it moves to an uppermost position of its pivotal movement and actuates the lower switch SW2 when it moves to a lowermost position of its pivotal movement. The pin 45 has pivotally connected thereto one end of connecting rod 47 which has the control pin 44 secured to the other end thereof. Thus, the control pin 44 of the connecting rod 47 moves in reciprocatory movement in the directions of an arrow P while the second drive disk 90 rotates. The L-shaped lever 48 which is mounted on the shaft 48' has secured to one end thereof a spring 92 connected to the control solenoid 100 and is formed, at the other end thereof, with the slit 49 which loosely receives therein the control pin 44 of the connecting rod 47. L-shaped lever 48 is normally urged by the biasing force of a tension spring 94 to move clockwise about shaft 48'. The control disk 42 mounted on the control shaft 41 is located for rotation in close proximity to the connecting rod 47 and lever 48. The control disk 42 is formed at its circumference with a plurality of click recesses 97 in a position which is near the control pin 44, and with a plurality of click recess 98 remote from the control pin 44. A lever 91 having attached thereto a pin 99 cooperating with the recesses 98 is mounted for pivotal motion about a pivot. The lever 91 is normally urged by the biasing force of a spring 93 to move in a direction in which the pin 99 is brought into engagement in one of the recesses 98. 96 is an abnormal position detecting switch according to the invention.

In FIG. 16, if the control solenoid 100 is energized during the time the forward end 52a of the lever 52 moves from switch SW2 to switch SW1 to actuate the latter, then the L-shaped lever 48 is moved, through spring 92, counterclockwise about shaft 48', so that the control pin 44 secured to connecting rod 47 is moved out of the slit 49 formed in the lever 48 into engagement in one of the click recesses 47 as the forward end 52a of the lever 52 moves. Then, the control pin 44 moves downwardly as the pin 45 is moved downwardly by the rotation of drive disk 90. At this time, the control pin 44 rotates the control disk 42 counterclockwise one step, and then the pin 44' is released from the recess 97. Rotation of control disk 42 causes the pin 99 of the lever 91 to move from one of the recesses 48, in which it is in engagement, to another recess 48. By being brought into engagement in another recess 48, the pin 99 performs a click action.

When it is desired to rotate clockwise the control disk 42 which, as shown in FIG. 16 has the pin 99 of lever 91 disposed in position "1", until the pin 99 is moved to position "N", a clockwise rotation signal is supplied to a change-over control circuit shown in FIG. 17. Then, actuation of switch SW1 by the forward end 52a of lever 52 causes a flip-flop 412 to produce a signal through an AND circuit 411. This signal energizes the control solenoid 100 through an OR circuit 430 and a drive circuit. At this time, the connecting rod 47 is moving upwardly, so that energization of control solenoid 100 causes the control pin 44 to move into one of the click recesses 97 with the rotation of the lever 48, and the control pin 44 moves the control disk 42 clockwise. The clockwise rotation signal is being supplied until the pin 99 of lever 91 reaches position "N". When it is desired to move the pin 99 from position "N" to position "1" or "2", a counterclockwise rotation signal is supplied to the change-over control circuit to energize the control solenoid 100 through an AND circuit 421, a flip-flop 422, OR circuit 430 and the drive circuit so that the control disk 42 can be moved counterclockwise.

If the power source is disconnected or other trouble occurs while the control disk 42 is in motion, the control disk 42 will stop in an incorrect position. For example, the pin 99 may stop in a projection between the two recesses 98 and 98. At this time, the lever 91 is disposed in a position which is located counterclockwise from its position in FIG. 16, so that the switch 96 is actuated to form a circuit shown in broken lines in FIG. 18. This causes a current to be passed from the power source to a delay circuit 960. If the passing of the current continues a period of time which is determined by the time constant of the delay circuit 960, then the delay circuit produces a trouble signal 961 which, as shown in FIG. 17, energizes the control solenoid 100 through the OR circuit 430 and drive circuit, thereby rotating the control disk 42 in either direction as aforementioned to move the same to its normal position. Upon the pin 99 being brought into engagement in one of the click recesses 98 and 98 which is its normal position, the switch 96 breaks the circuit and the trouble 961 disappears. If the formation of the circuit by the switch 96 lasts a period of time which is shorter than the period of time determined by the time constant of delay circuit 960, no trouble signal is produced by the circuit 960. Thus, the switch 96 is prevented from producing an abnormal signal when the pin 99 moves normally from one click recess to the next click recess.

Figure 19:
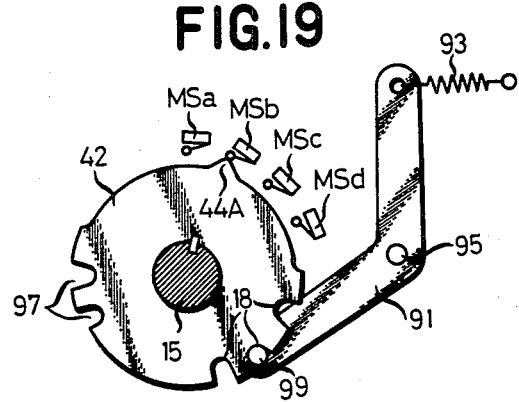
FIG. 19 shows another modification of the control shaft mechanism.
Figure 20:
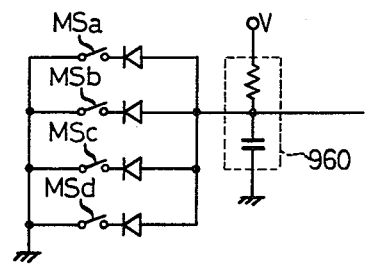
FIG. 20 shows a circuit for detecting misoperation of the control shaft mechanism shown in FIG. 19.

In another embodiment shown in FIG. 19, position confirming switches MSa, MSb, MSc and MSd are arranged along the edge of the control disk 42 in place of the switch 96 shown in FIG. 16, and a projection 44A cooperating with the switches MSa, MSb, MSc and MSd are formed in the edge of the control disk 42. A circuit formed by these switches is shown in FIG. 20. Upon one of the position confirming switches being actuated by the projection 44A, the actuated switch is closed to ground the delay circuit 960, so that no trouble signal is produced by the delay circuit 960. This is also the case when one of the position confirming signals shifts from a closed position to an open position and the next following position confirming switch is closed within a predetermined period of time. However, if none of the position confirming switches is closed and thus all the position confirming switches remain open over a predetermined period of time, then a trouble signal is produced by the delay circuit 960. The trouble signal rotates the control disk 42 in the same manner as described by referring to FIG. 17, thereby moving the control disk 42 to a normal position.

When a trouble signal is produced by the circuit shown in FIG. 18 or 19, it is possible to produce such signal as a warning signal which informs the operator of the occurrence of trouble without driving the control disk 42. Alternatively, it is possible to provide a circuit which, if a trouble signal is used to drive the control disk 42, produces a warning signal to the operator only when the control disk 42 does not return to its normal position after lapse of a predetermined time.

From the foregoing description, it will be appreciated that the control unit for the drive for a rotatable control shaft according to the invention is capable of automatically actuating the drive for a rotatable control shaft, when the control shaft does not reach a predetermined normal position after lapse of a predetermined time, to return the control shaft to the normal position, or fiving a warning that the control shaft is not in its normal position.

What is claimed is:

1. An improved automatically controllable offset printing machine having eight discrete states of operation in each cycle, the machine comprising a drive motor arranged to be energized during each but the first of the eight states of operation, an ink kneading device operatable during the second of said states of operation, a rotatable cylinder for supporting a removable master plate, a master plate feeder operable only during the third of said states to feed a master plate to said master cylinder, an etching device operable only during the third of said states and including a roller for applying an ink-repellent etching solution to a master plate when mounted on said master cylinder, an ink device operable only during the fourth of said states for applying ink to a master plate, a rotatable blanket cylinder operable only during the fifth of said states and arranged to engage said master cylinder to receive an ink image from a master when on said master cylinder, a sheet feeder operable during the sixth and eighth of said states for feeding copy sheets to said blanket cylinder, an impression cylinder for urging copy sheets against said blanket cylinder, cleaning means operable only during the seventh of said states for cleaning said blanket cylinder, master plate ejection means operable only during the seventh of said states for ejecting a used master plate from said master cylinder, a control shaft mechanism including a control shaft arranged to be located in a first position during the second, third, seventh and eighth states to create a mechanical condition such that at least the inking device is disengaged from a master plate when on said master cylinder, and arranged to be located in a second position during the fourth, fifth and sixth states to create a mechanical condition such that at least the inking device is in engagement with a master plate when on said master cylinder, a cam and linkage mechanism operable to switch the control shaft between the first and second positions, and drive means operable to actuate said cam and linkage mechanism to cause the control shaft to switch between the first and second positions, the improvement comprising (a) shaft position detecting means for detecting the actual position of the control shaft, (b) an instruction decoder having eight output terminals to decode a stop signal for said drive motor, an ink knead signal for controlling the operation of said ink kneading device, an etch signal for controlling the rotation of the roller in said etching device, an ink form signal for controlling the operation of said ink forming device, a transfer signal for effecting engagement of said master and said blanket cylinders, a print signal for controlling the operation of said sheet feeder, a clean signal for said cleaning means, and a final signal, (c) a shaft position judging circuit connected to the instruction decoder and the shaft position detecting means, said shaft position judging circuit including first gate means to designate a desired position for the control shaft in each of said states, second gate means responsive to the desired position and actual position of the control shaft to energize the drive means of the control shaft mechanism when the designated and actual positions are not the same, and third gate means to provide either a first position agreement signal or a second position agreement signal respectively when the control shaft is in the desired first or second position, (d) a synchronizing unit for generating a synchronizing pulse each time said master cylinder makes one complete revolution, (e) a binary counter arranged to be enabled by a respective one of etch, ink form, transfer and clean signals to count the synchronizing pulses, (f) a sequence counter arranged to be enabled by the etch and clean signals to count the synchronizing pulses, said sequence counter also producing a signal for making the master plate feeding operation and the master ejection operation effective during a period of corresponding to one complete revolution of the master cylinder during the presence of the etch signal, and subsequently, producing an end signal when the master cylinder has rotated through a predetermined number of revolutions, (g) a presettable copy number counter arranged to count the number copy sheets passing through the machine during the printing operation and to produce an output signal when the counted value coincides with the preset value, (h) operation duration setting means including four independent rotary switches each presettable to a value indicative of the desired period respectively for etching, ink forming, transferring and cleaning operations, and a coder responsive to the setting of each said rotary switch to produce a binary output signal corresponding thereto, (i) a coincidence circuit for comparing the instantaneous count of the binary counter with each output of said coder and to provide a coincidence signal when coincidence is detected, (j-1) signal conversion means having a diode matrix, (j-2) jump gate means having a first AND gate which permits the passage of the ink knead signal so as to produce an etching instruction of four-bit code in the diode matrix when the first position agreement signal is produced, a second AND gate which permits the passage of the etch signal to produce an inking instruction of four-bit code in the diode matrix when the coincidence signal is produced, a third AND gate which permits the passage of the ink form signal to produce a transfer instruction of four-bit code in the diode matrix when the coincidence signal is produced, a fourth AND gate which permits the passage of the transfer signal to produce a printing instruction of four-bit code in the diode matrix when the coincidence signal is produced, a fifth AND gate which permits the passage of the print signal to produce a cleaning instruction of four-bit code in the diode matrix when the output signal from the copy number counter is received, a sixth AND gate which permits the passage of the clean signal to produce a final instruction of four-bit code in the diode matrix when the coincidence signal is produced, and a seventh AND gate which permits the passage of the final signal from the instruction decoder to produce a stop instruction of four-bit code in the diode matrix when the end signal is produced at the sequence counter while a single mode signal is produced for single mode operation, and (j-3) a first detector to detect the presence of a signal at any one of the AND gates in the jump gate means, (k) a single pulse generator connected to the first detector to generate a clocked clock pulse synchronized with the synchronizing pulses from an oscillator in response to an output signal from the first detector, (l) a register arranged to store an instruction code from the diode matrix in response to the clocked clock pulses and arranged to apply the stored instruction to the instruction decoder for conversion of the instruction into a said signal corresponding to the code stored by the register, (m) an auto start switch and (n) start gate means responsive to actuation of the auto start switch when a stop signal is produced by the instruction decoder, to supply a signal indicative of the ink kneading state to the register, to supply a signal for generating a clocked clock pulse to the single pulse generator, and to produce a motor start signal, the binary counter and said sequence counter being reset by the clocked clock pule from the single pulse generator.

2. The improved machine according to claim 1, further comprising an auto-manual switch for switching the machine between automatic and manual operation, a manual input circuit including manually operable switches for selecting one of the second to eighth of said states, a second diode matrix coder having a plurality of inputs connected to the manual operation switch, a set of four outputs, and a plurality of diodes for connecting each input to a selected one or selected ones of the outputs in a manner such that the state selected by said manual operation switch is produced in the same code obtained by the diode matrix of said signal conversion means, and also including a second detector for detecting a signal at any one of said outputs and for feeding it to said one shot pulse generator, an input selecting gate having two sets of four input terminals and a set of four output terminals, one set of said input terminals being connected to the output of the diode matrix of the signal conversion means and the other set of said input terminals being connected to the outputs of the diode matrix of the manual input circuit, said output terminals being connected to the instruction decoder, and said input selecting gate being arranged to feed instructions from the input terminals to the instruction decoder when only one set of said input terminals is enabled in response to operation of said auto-manual switch.

3. The improved machine according to claim 2, further including a mode selector for selectively producing the single mode signal to operate the machine in one of a single cycle mode and a repeat mode signal for a repeat cycle mode of operation, and wherein said jump gate means includes an eigth AND gate connected to receive the final signal from the instruction decoder, the end signal from the sequence counter and said repeat mode signal, and to produce an instruction of four-bit code in the diode matrix representative of one of the ink kneading and etching state on the outputs of the signal conversion means when the final signal, the end signal and the repeat mode signal are simultaneously received.

4. The improved machine according to claim 3, wherein said final signal is a marker insertion signal arranged to control the copy sheet feeding operation, and wherein said sequence counter is enabled by said marker insertion signal to count said synchronizing pulses and produce a signal for actuating the sheet feeder during the period corresponding to one complete revolution of the master cylinder.

5. The improved machine according to claim 1, including a cycle termination switch for producing the cleaning instruction of four-bit code in the diode matrix of the signal conversion means.

6. The improved machine according to claim 2, including a cycle termination switch for producing the cleaning instruction of four-bit code in the diode matrix of the signal conversion means.

7. The improved machine according to claim 3, including a cycle termination switch for producing the cleaning instruction of four-bit code in the diode matrix of the signal conversion means.

8. The improved machine according to claim 4, including a cycle termination switch for producing the cleaning instruction of four-bit code in the diode matrix of the signal conversion means.

9. The improved machine according to claims 1 or 2 or 3 or 4 or 5 including means for detecting an error in the operation of said master plate ejection means and responsive thereto to produce a signal to effect a shut down of the printing machine, and a latching circuit for latching the instantaneous code stored by the register in the event of a machine shut down and to restore the state of operation of the machine to that stored by the register when the machine is restarted.

10. The improved machine according to claim 9, wherein the etching device includes premoistening means for premoistening the etching roller, a premoistening circuit for controlling the premoistening of the etching roller and a circuit for rotating the said etching roller after the premoistening operation, the premoistening circuit comprising an OR circuit having two inputs, respectively for receiving a cleaning instruction and an etching instruction, and a premoistening period changing switch connected to the input of said OR circuit arranged to receive said cleaning instruction.

11. The improved machine according to claims 1 or 2 or 3 or 4 or 5, wherein the etching device includes premoistening means for premoistening the etching roller, a premoistening circuit for controlling the premoistening of the etching roller and a circuit for rotating the said etching roller after the premoistening operation, the premoistening circuit comprising an OR circuit having two inputs, respectively for receiving a cleaning instruction and an etching instruction, and a premoistening period changing switch connected to the input of said OR circuit arranged to receive said cleaning instruction.

12. The improved machine according to claim 11, including detection circuit means for detecting an error in master plate feeding, trouble reporting means, said trouble reporting means including process indicators each connected through a drive circuit to one of the outputs of the signal conversion means, a plurality of AND circuits, each AND circuit being mounted between each said drive circuit and each said output of the signal conversion means, low frequency generating means, and gate means arranged to receive at its two inputs, a signal from said low frequency generating means and a signal from said detection circuit means, said means being arranged to intermittently close said AND circuits in response to simultaneous signals from said low frequency generating means and said detection circuit means.

13. The improved machine according to claims 1 or 2 or 3 or 4 or 5, including detection circuit means for detecting an error in master plate feeding, trouble reporting means, said trouble reporting means including process indicators each connected through a drive circuit to one of the outputs of the signal conversion means, a plurality of AND circuits, each AND circuit being mounted between each said drive circuit and each said output of the signal conversion means, low frequency generating means, and gate means arranged to receive at its two inputs, a signal from said low frequency generating means and a signal from said detection circuit means, said means being arranged to intermittently close said AND circuits in response to simultaneous signals from said low frequency generating means and said detection circuit means.

* * * * *